(12) United States Patent
Schoon et al.

(10) Patent No.: US 11,930,731 B2
(45) Date of Patent: Mar. 19, 2024

(54) SIMULTANEOUS MAPPED VIEW OF HISTORICAL AND REALTIME GEOSPATIAL AND NON-GEOSPATIAL DATA

(71) Applicant: Kinze Manufacturing, Inc., Williamsburg, IA (US)

(72) Inventors: Jason Schoon, Williamsburg, IA (US); Ryan McMahan, Williamsburg, IA (US); Matthew Moeller, Williamsburg, IA (US); Daniel Hunter, Kellogg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 418 days.

(21) Appl. No.: 17/301,567

(22) Filed: Apr. 8, 2021

(65) Prior Publication Data

US 2021/0315151 A1  Oct. 14, 2021

Related U.S. Application Data

(60) Provisional application No. 63/007,623, filed on Apr. 9, 2020.

(51) Int. Cl.

| | |
|---|---|
| *A01D 41/127* | (2006.01) |
| *A01B 79/00* | (2006.01) |
| *A01B 79/02* | (2006.01) |
| *A01C 7/10* | (2006.01) |
| *A01C 21/00* | (2006.01) |

(Continued)

(52) U.S. Cl.
CPC ............ *A01B 79/005* (2013.01); *A01B 79/02* (2013.01); *A01C 7/102* (2013.01); *A01C 21/005* (2013.01); *G01C 21/3807* (2020.08); *G05B 13/026* (2013.01); *G07C 5/02* (2013.01)

(58) Field of Classification Search
CPC .... A01B 79/005; A01B 79/02; G05B 13/026; A01D 41/1274; G01C 21/3807
See application file for complete search history.

(56) References Cited

U.S. PATENT DOCUMENTS

| | | |
|---|---|---|
| 5,878,371 A | 3/1999 | Hale et al. |
| 6,516,271 B2 | 2/2003 | Upadhyaya et al. |

(Continued)

OTHER PUBLICATIONS

International Preliminary Report on Patentability in PCT/US2021/026345, dated Oct. 20, 2022, 9 pages.

(Continued)

*Primary Examiner* — Dalena Tran
(74) *Attorney, Agent, or Firm* — McKee, Voorhees & Sease, PLC

(57) ABSTRACT

Continued and precise operation of an agricultural implement exists even where a subsystem, such as a GPS receiver, wireless communicator, a sensor, or the like, fails, falters, or is otherwise unusable. Data is continually tracked to the extent possible during failure or faltering and is temporarily stored. The temporary data is later stitched or otherwise harmonized with historical data once the failing system is repaired or otherwise once again available. During failure or faltering, views, and even mapped views, of historical and real-time data are displayed. Predicted or anticipated data can be included within these views or can even be used when stitching.

19 Claims, 16 Drawing Sheets

(51) Int. Cl.
*G01C 21/00* (2006.01)
*G05B 13/02* (2006.01)
*G07C 5/02* (2006.01)

(56) References Cited

U.S. PATENT DOCUMENTS

| | | |
|---|---|---|
| 9,652,840 B1 * | 5/2017 | Shriver et al. ........ G06T 7/0004 |
| 2016/0366815 A1 * | 12/2016 | Guyette et al. ...... A01C 23/007 |
| 2017/0185086 A1 | 6/2017 | Sauder et al. |
| 2018/0143130 A1 | 5/2018 | Shearer et al. |
| 2019/0343035 A1 | 11/2019 | Smith et al. |
| 2019/0357426 A1 | 11/2019 | Wolff et al. |
| 2020/0000006 A1 | 1/2020 | McDonald et al. |
| 2020/0008347 A1 | 1/2020 | Koch et al. |
| 2020/0019159 A1 | 1/2020 | Kocer et al. |
| 2020/0103910 A1 | 4/2020 | Sauder et al. |
| 2020/0110403 A1 | 4/2020 | Antich |
| 2020/0110423 A1 | 4/2020 | Antich |
| 2021/0011471 A1 | 1/2021 | Hurd |
| 2021/0144911 A1 * | 5/2021 | Plattner ................ A01C 21/005 |

OTHER PUBLICATIONS

International Searching Authority in connection with PCT/US2021/026345 filed Apr. 8, 2021, "The International Search Report and the Written Opinion of the International Searching Authority, or the Declaration", 13 pages, dated Jul. 16, 2021.

* cited by examiner

SIMULTANEOUS MAPPED VIEW OF HISTORICAL AND REALTIME GEOSPATIAL AND NON-GEOSPATIAL DATA

CROSS REFERENCE TO RELATED APPLICATIONS

This application claims priority under 35 U.S.C. § 119 to provisional patent application U.S. Ser. No. 63/007,623, filed Apr. 9, 2020. The provisional patent application is herein incorporated by reference in its entirety, including without limitation, the specification, claims, and abstract, as well as any figures, tables, appendices, or drawings thereof.

FIELD OF THE INVENTION

The invention relates generally to computerized methods, systems, and apparatuses for predicting, tracking, and harmonizing agricultural data in situations where one or more inputs or subsystems are hindered or temporarily unavailable. Even more particularly, but not exclusively, the invention relates to a method for simultaneously viewing, for example on a shared map, historical and real-time data in said situations.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Agricultural implements perform a variety of agricultural operations. For example, an agricultural row crop planter is a machine built for precisely distributing seed into the ground. The row crop planter generally includes a horizontal toolbar fixed to a hitch assembly for towing behind a tractor or other implement. Row units are mounted to the toolbar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

In its most basic form, the seed meter includes a housing, a seed disk, and a seed chute. The housing is constructed such that it creates a reservoir to hold a seed pool. The seed disk resides within the housing and rotates about a generally horizontal central axis. As the seed disk rotates, it passes through the seed pool where it picks up individual seeds. The seeds are subsequently dispensed into the seed chute where they drop into the seed furrow. The seed meters are given a location along a toolbar of a planter, and the location determines at least some functionality of the meter.

Over the years, improvements to components on the planters, including actuators (hydraulic, pneumatic, electric, or a combination thereof), sensors, data handling systems, location systems, communication systems, lighting systems, and other systems capable of controlling functions of the planter, have increasingly automated the planter. As a result, components of the planter now rarely perform their respective functions in isolation. Rather, and for example, the accuracy of a location system may rely on not only GPS, but on other sensors located on the planter. These same location systems might then help determine which, when, and to what degree certain actuators should be engaged, and so forth.

In some agricultural implements, the degree to which the components are interrelated and automated are so great the agricultural implement can be considered mostly or even fully autonomous, requiring little to no human input in order to operate. Farmers have thus been presented with new hurdles.

If one system falters, the operation of several other systems may be severely compromised until the failing system resumes normal operation. For example, if GPS were to be even temporarily unavailable and the location system were to falter, the aforementioned actuators, such as down force actuators, on the planter could malfunction and apply too little or too much force, thereby jeopardizing planting efficiency.

Thus, there now exists a need in the art for an improved methods, systems, and apparatuses on or in use with an agricultural implement that will allow for continued and precise operation of the implement even where one or more systems fails, falters, or is otherwise unavailable.

SUMMARY OF THE INVENTION

It is a primary object, feature, and/or advantage of the invention to improve on or overcome the deficiencies in the art. The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is still yet a further object, feature, and/or advantage of the invention to use historical and/or sensed information to anticipate planting requirements and/or expected productivity. Anticipated results and/or data can be replaced with actual data after planting.

It is still yet a further object, feature, and/or advantage of the invention to avoid using inexact approximations as much as possible. Where inexact approximations must be made, data based on the same should be marked accordingly, such as through the use of more data (e.g., tags) and/or with accompanying metadata.

It is still yet a further object, feature, and/or advantage of the invention to simultaneously and intuitively view two separate sets of data. For example, data directed towards live performance of a planter and historical, geospatially located data can be adjacently located and displayed on a single map which utilizes like symbols.

It is still yet a further object, feature, and/or advantage of the invention to stitch two data sets together without irreversibly losing information. The data sets should be kept separate for at least a temporary time. Data may be harmonized at a later time, such as after an operator confirms combability and accuracy of the two data sets, which may involve prioritizing one data set over the other where conflicts exist.

It is still yet a further object, feature, and/or advantage of the invention to store and access agricultural data at a location remote of the agricultural implement, such as in a cloud-based storage system.

The computerized methods and systems disclosed herein can be used in a wide variety of agricultural operations, including planting, tilling, baling, harvesting, spraying, transporting, cultivating, harrowing, plowing, fertilizing, broadcasting, loading, unloading, and the like. Some aspects of the computerized methods and systems disclosed herein may even have use in other industries which rely heavily on communications and/or navigation, such as the automotive, nautical, and/or aerospace industries.

It is still yet a further object, feature, and/or advantage to support internet of things (IoT) and other environments in which information, data, or the like is transmitted efficiently with higher speed and higher bandwidth.

It is still yet a further object, feature, and/or advantage of the invention to provide safe, cost effective, and reliable outcomes for farmers using the computerized methods disclosed herein.

It is still yet a further object, feature, and/or advantage of the invention to display aspects of the computerized methods disclosed herein with distinct aesthetic features, including, but not limited to, maps, tables, and other text or images which otherwise enhance interfacing with electronics of the agricultural implement. For example, the user experience can be enhanced or otherwise further facilitated by means of a graphical user interface which presents the user with intuitive controls and/or automatically alerts an operator of the agricultural implement to potential problems and/or to prompt the operator for manual input, such as where potential problems cannot be resolved automatically. By way of another example, graphical user interfaces can be tailored to intuitively, such as by comparison, and simultaneously, such as in a compact space, show more than one data set.

It is still yet a further object, feature, and/or advantage of the invention to practice computerized methods which facilitate use, manufacture, assembly, maintenance, and repair of an agricultural implement accomplishing some or all of the previously stated objectives.

It is still yet a further object, feature, and/or advantage of the invention to incorporate a computerized method into electronic apparatuses or agricultural systems accomplishing some or all of the previously stated objectives. Unit(s) of the agricultural system can be partially or fully autonomous.

According to some aspects of the present disclosure, a method of displaying agricultural data comprises tracking a geographic location of an agricultural implement at least in part with a global positioning system (GPS) receiver, sensing, in real-time, one or more agricultural characteristics, and producing agricultural data from the agricultural characteristics. While maintaining a GPS connection, the agricultural data is stored as historical data and shown or mapped on a display. While not maintaining the GPS connection, the agricultural data is stored as temporary data and is shown or mapped on the display adjacent the historical data. Anticipated planting data can also be shown or mapped on the display, said anticipated planting data being adjacent and/or integrated with the historical and/or temporary data.

According to some other aspects of the present disclosure, a computerized system for use with an agricultural implement comprises a navigation system, a transmitter capable of employing at least one communication protocol and connecting to a network, a sensor for sensing one or more agricultural characteristics, and a non-transitory computer readable medium comprising a processor, a memory, an operating system, and a compiler. The non-transitory computer readable medium is configured, e.g., by way of appropriate hardware and/or software components, to carry out computerized method steps related to the performance of agricultural tasks and/or handling agricultural data.

These and/or other objects, features, advantages, aspects, and/or embodiments will become apparent to those skilled in the art after reviewing the following brief and detailed descriptions of the drawings.

BRIEF DESCRIPTION OF THE DRAWINGS

Several embodiments in which the invention can be practiced are illustrated and described in detail, wherein like reference characters represent like components throughout the several views. The drawings are presented for exemplary purposes and may not be to scale unless otherwise indicated.

DETAILED DESCRIPTION OF THE INVENTION

The following definitions and introductory matters are provided to facilitate an understanding of the invention. Unless defined otherwise, all technical and scientific terms used herein have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" as used herein are not intended to refer to any single embodiment of the particular invention but encompass all possible embodiments as described in the specification and the claims.

The term "about" as used herein refers to slight variations in numerical quantities with respect to any quantifiable variable. One of ordinary skill in the art will recognize inadvertent error can occur, for example, through use of typical measuring techniques or equipment or from differences in the manufacture, source, or purity of components.

The claims include equivalents to the quantities whether or not modified by the term "about."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are referenced according to the views presented. Unless context indicates otherwise, these terms are not limiting.

In communications and computing, a computer readable medium is a medium capable of storing data in a format readable by a mechanical device. The term "non-transitory" is used herein to refer to computer readable media ("CRM") that store data for short periods or in the presence of power such as a memory device.

One or more embodiments described herein can be implemented using programmatic modules, engines, or components. A programmatic module, engine, or component can include a program, a sub-routine, a portion of a program, or a software component or a hardware component capable of performing one or more stated tasks or functions. A module or component can exist on a hardware component independently of other modules or components. Alternatively, a module or component can be a shared element or process of other modules, programs, or machines.

Mechanical, electrical, chemical, procedural, and/or other changes apparent to one of ordinary skill in the art can be made without departing from the spirit and scope of the invention.

Figure 1:
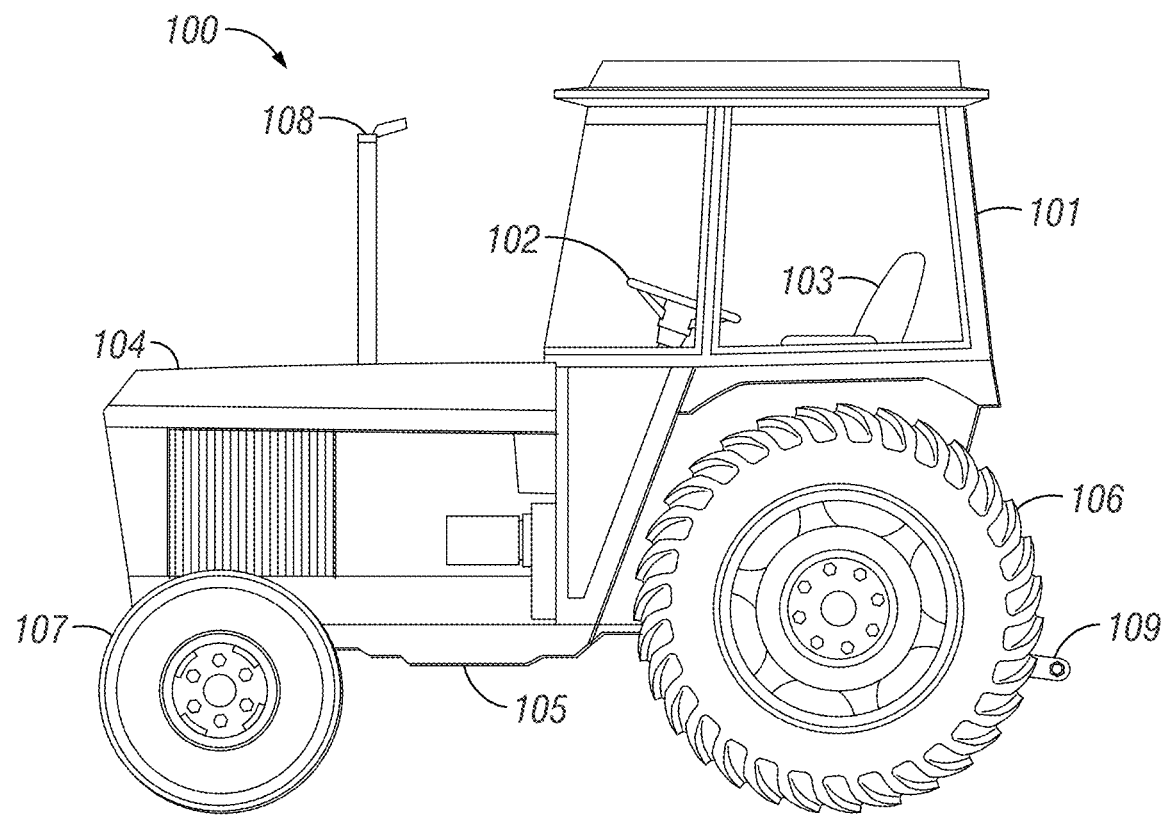
FIG. 1 shows a side elevational view tractor.

FIG. 1 shows a tractor 100 used to deliver high torque at slow speeds, for the purposes of hauling machinery used in agriculture. The tractor 100 includes a cab 101 with a steering wheel 102 and a seat 103 for an operator. The tractor 100 also includes a vehicle frame 104 which houses an engine (not shown) located near the front axle of the tractor 100 and in front of the cab 101. The cab 101 and vehicle frame 104 are supported, structurally, by the tractor's chassis 105, which attaches to rear drivable wheels 106 and front steerable wheels 107, said front steerable wheels 107 operationally connected to the steering wheel 102. An exhaust pipe 108 allows carbon monoxide to exit the tractor 100 during operation of the engine (not shown). A tractor hitch 109 allows for connection between agricultural machinery and the tractor 100.

Figure 2:
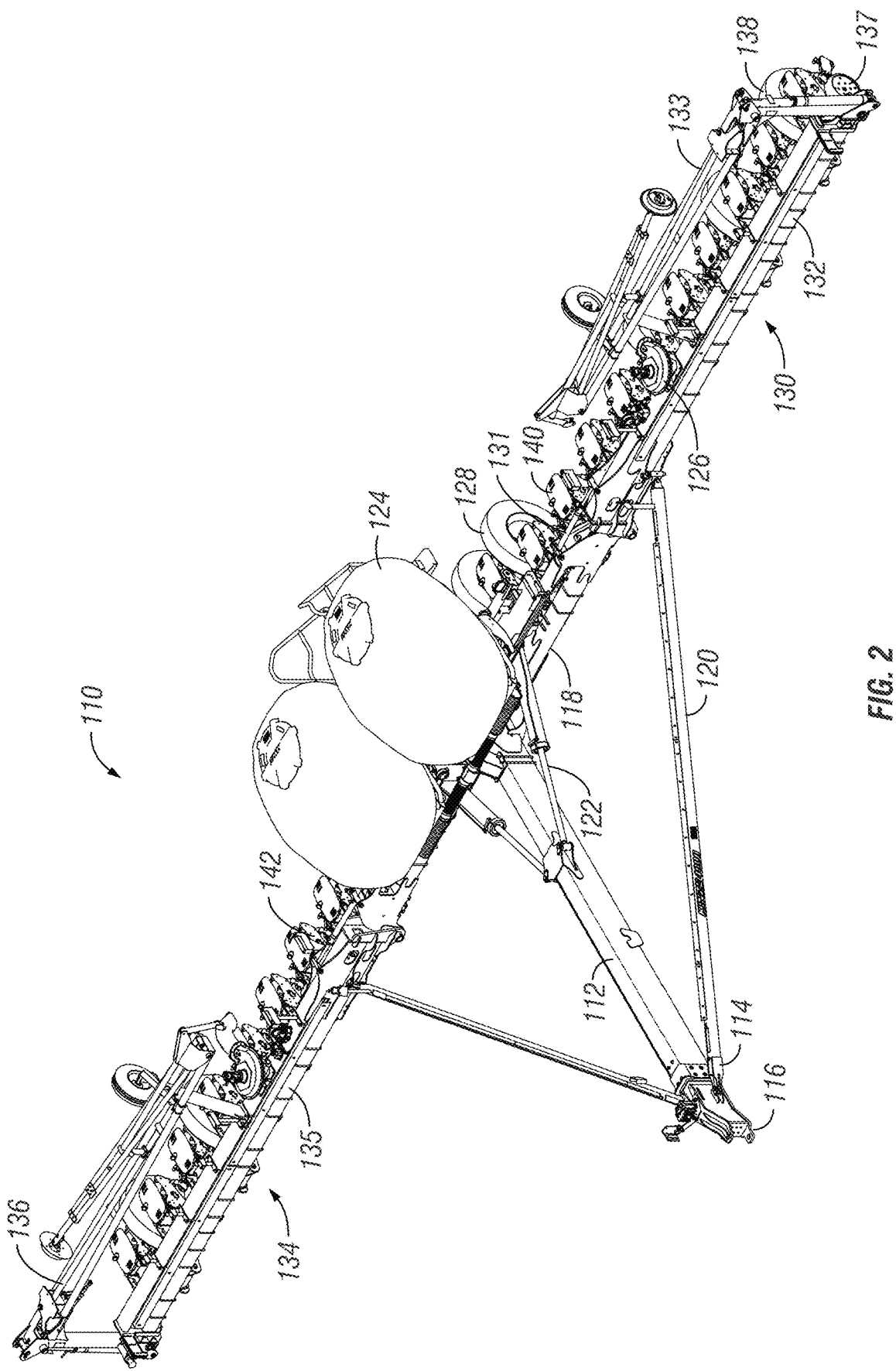
FIG. 2 shows a perspective view of a planter.

FIG. 2 shows a planter 110 used to plant and fertilize seed in a controlled manner. For example, the planter 110 as shown in FIG. 2 includes a tongue 112, preferably telescoping. The tongue 112 includes a first end 114 with an implement hitch 116 for attaching to a tow vehicle, such as the tractor 100. The opposite end of the tongue 112 is attached to a frame or central toolbar 118. Draft links 120 are connected between the central toolbar 118 and the tongue 112 and are used in conjunction with folding actuators 122 to fold the central toolbar 118 in a frontward manner. Therefore, the tongue 112 maybe a telescoping tongue in that it can extend or track to allow for the front folding of the central toolbar 118. The central toolbar 118 includes first and second wings 130, 134 extending therefrom. The central toolbar 118 includes central hoppers 124 which contain seed or other granules used with planting. A plurality of transport wheels 128 also are connected to the central toolbar 118. The first and second wings 130, 134 are generally mere images of one another. The wings include first and second wing toolbars 132, 135. Attached along the central toolbar 118 as well as the first and second wing toolbar 132, 135, are a plurality of row units 140. The row units include seed meters 142 and/or other components used for planting and fertilizing seed in a controlled manner. Also connected to the first and second wings 130, 134 are first and second markers 133, 136. The markers include actuators 137 which are used to raise and lower the markers 133, 136. The markers 133, 136 can be lowered to provide guidance for the edge of a planter for use in planting. When not required, the markers can be lifted to a position as that shown in FIG. 2 to move the markers out of the way.

Also shown in FIG. 2 are a plurality of fans 126 as well as a plurality of wheels 138. The wings may also include actuators 131 to raise and lower or otherwise provide a downward force on the wings. Therefore, as is shown in FIG. 2, there are a multiplicity of components of the planting implement 110. The components may include moving parts, such as the actuators used to move the wings, markers, row units, etc., while also providing additional functions. For example, the fans 126 are used to provide a pressure in the seed meters 142 to aid in adhering seed to a seed disk moving therein. The seed meters may be electrically driven in that a motor, such as a stepper motor, can be used to rotate the seed meters to aid in adhering seed thereto and to provide for dispensing of the seed in a controlled manner for ideal spacing, population, and/or placement. Other features may include actuators or other mechanisms for providing down force to the row units 140. Lights may also be included as part of the planter. Finally, an air seed delivery system may be provided between the central hoppers 124 and any plurality of seed meters 142 on the row units 140 in that the air seed delivery system provides a continued flow of seed to the row units on an as needed manner to allow for the continuous planting of the seed via the seed meters on the row units. Thus, the various controls of the planter may require or otherwise be aided by the use of an implement control system. The implement control system can aid in controlling each of the functions of the implement or planter 110 so as to allow for the seamless or near seamless operation with the implement, and also provides for the communication and/or transmission of data, status, and other information between the components.

Figure 3:
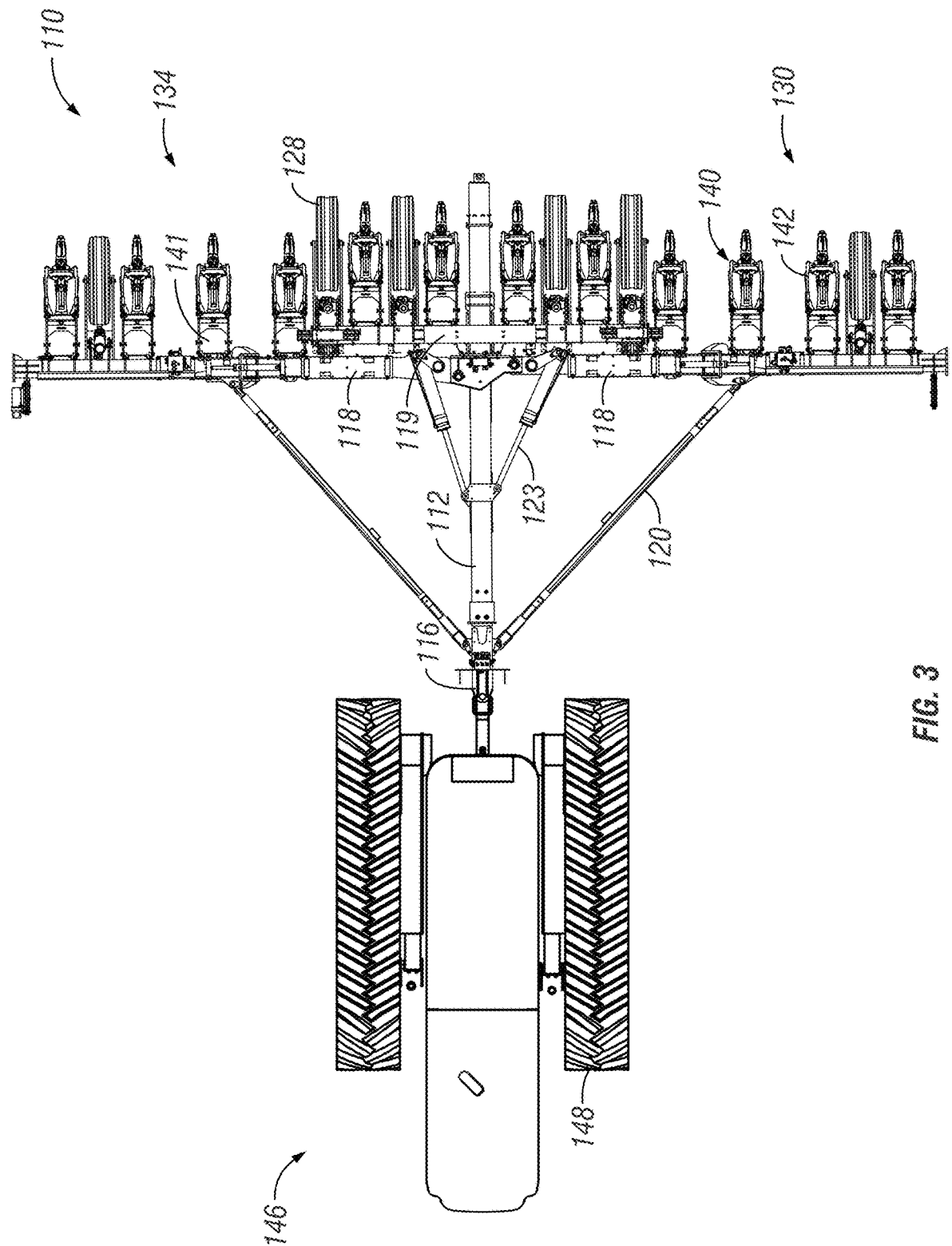
FIG. 3 shows a top plan view of the tug unit with the planter.

As shown in FIG. 3, the planter 110 can also be pulled by a self-propelled, autonomous tug unit 146, rather than an operator-driven vehicle, such as the tractor 100, such as the one shown and described in co-owned U.S. Pat. No. 10,575,453, which is herein incorporated by reference in its entirety. The rear drivable wheels 106 and front steerable wheels 107 can be substituted for tracks 148, regardless of whether said tracks 148 are implemented on an operator-driven vehicle or a self-propelled vehicle.

The amount of information being transmitted between the tractor and the components of the planter are ever growing and includes high traffic. Currently, any transmission of the information is done with low bandwidth, poorly defined protocol, and also includes compatibility issues among the various components of the tractor and/or implements. Therefore, issues have emerged, and new type have developed for a system including a high traffic mix, low latency, high security, high reliability, high throughput, common supply chain, and highly rugged system to allow for the operation of the implement and to aid in controlling the various components on or associated with the implement. Therefore, as well be understood, the present disclosure provides for solutions to meet said emerging requirements, which can include ruggedization and/or input/output (I/O) complements. The solution has been developed with standard protocols and components with adjacent opportunities in mind. The result becomes an intelligent internet of things based solution supporting a unique complement of functions and input/output features.

Figure 4:
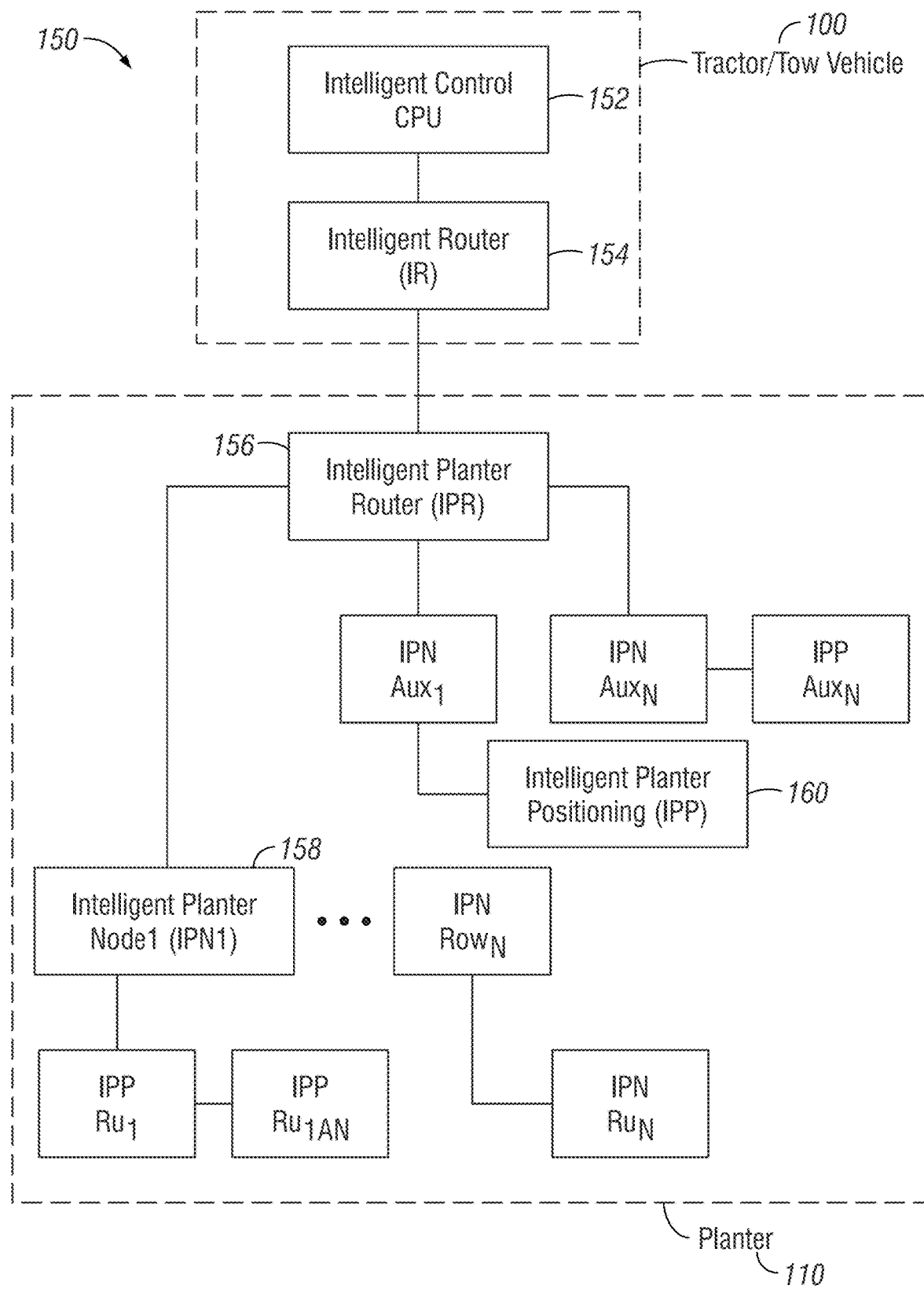
FIG. 4 is a schematic of an implement (planter) control system.

Therefore, FIG. 4 discloses an implement control system 150 according to aspects of the present disclosure. As is shown in the figure, some components of the implement control system 150 may be included not on the implement itself. For example, the implement control system as shown in the figure includes an intelligent control 152, which, for example, can employ a touch-screen display. Examples of such intelligent controls 152 may be tablets, telephones, handheld devices, laptops, user displays, or other computing devices capable of allowing input, providing options, and showing output of electronic functions. Still further examples include a microprocessor, a microcontroller, another suitable programmable device, other components implemented partially or entirely on a semiconductor (e.g., a field-programmable gate array ("FPGA") chip, such as a chip developed through a register transfer level ("RTL") design process).

The intelligent control 152 may be attached to or otherwise associated with an intelligent router unit 154. The intelligent router unit 154 can be included, but is not required in all instances. For example, when the intelligent control 152 is a tablet, the intelligent control 152 may not include the desired number of connections, inputs, and/or output capabilities. Therefore, the intelligent router 154 can be included to connect to the intelligent control 152 to provide additional inputs, outputs, and/or other connectivity to the intelligent control 152. The intelligent control 152 and/or intelligent router 154 can be remote of an implement, such as a planter 110. As shown in FIG. 4, the combination of the intelligent control 152 and intelligent router 154 are shown to be in the tractor 100 or other tow vehicle. When the intelligent control 152 is a tablet, the member can be positioned within the cab of a tractor to allow for the input and output to be shown on a display therein, such that an operator can view and interact with said display while in the tractor 100. However, it is to be appreciated that the control unit can be used generally anywhere remote of the planting implement.

Such a display can be, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, or a reflective bistable cholesteric display (i.e., e-paper).

FIG. 4 also shows components of the implement control system 150, which may be shown as part of the planter 110 or other implement. For example, some components may include an intelligent planter router ("IPR") 156, which can also be referred to as a planter personality module and is a type of intelligent implement router or intelligent router member. The IPR 156, as will be disclosed herein, provides for programmability to the planter, while also providing for connectivity to components and controls for various aspects of the planter. For example, the IPR 156 can include an intelligent control feature or member (central processing unit or the like) which can be programmed to provide information related to the planter 110. This can include the number of rows on a planter, type of planter, type of pressure for the seed meters, type of seed meters, number of seed meters, and generally any other information associated with the planter such that the information may be utilized to operate the functionality of the planter. Such programming of the IPR 156 can be done during manufacture of the planter, such as building thereof. Therefore, the IPR 156 can be programmed on an as-built basis to provide such information that can be transmitted with the other components of the implement control system 150. However, the configuration of the IPR 156 will provide information embedded in the CPU thereof during manufacture to provide options and settings for interaction with the other components of the implement control system 150. The IPR 156 can be connected to a plurality of intelligent planter nodes 258 which may be generically referred to as intelligent nodes or otherwise intelligent implement nodes.

The intelligent planter nodes (IPN) 158 can be used both for at the row units of a planter and/or for axillary functions of the planter. As shown in FIG. 4, the IPN 158 can be positioned at each row unit of the planter such that an IPN can be broken down by IPN row one, IPN row two all the way and up to IPN row N, wherein it is equal to the number of row units associated with the planter. Likewise, when the IPN 158 is used with an axillary function of the planter, the number of IPN's associated with the planter can be determined based on the number of axillary functions associated with the planter itself.

Still further, the implement control system 158 as shown in FIG. 4 includes a plurality of intelligent planter positioners (IPP) 160, generically referred to as intelligent positioning members or intelligent implement positioning members. The IPP 160, as will be disclosed herein can be utilized with each of the nodes or with any number of functions or components of the planter 110 to provide for additional information associated with the components. This can include the movement, location, or other data that can be collected via the IPP 160 that can be utilized and transmitted to the various components of the implement control system, such as the user display of the intelligent control 152.

Figure 5:
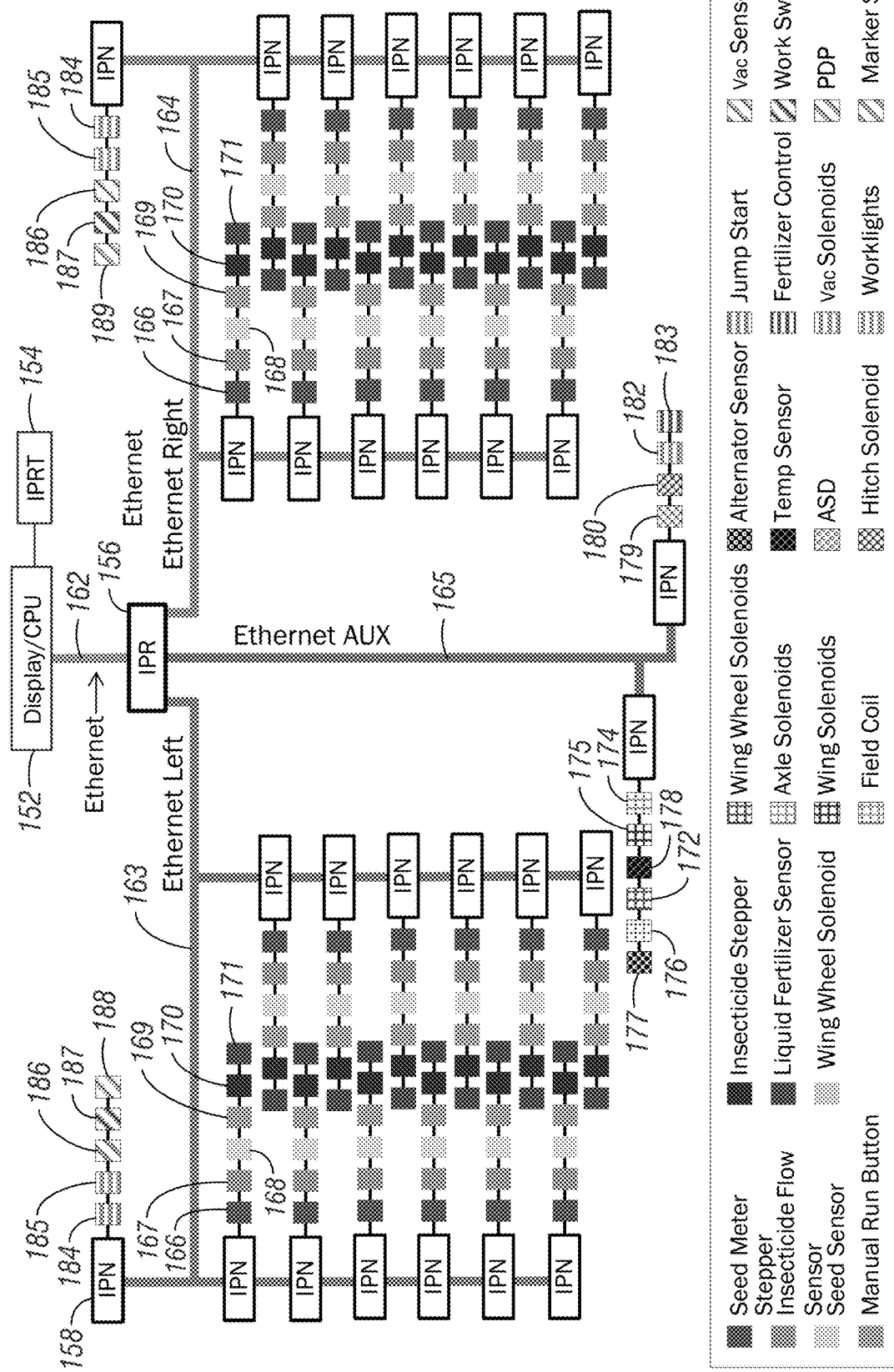
FIG. 5 is another schematic emphasizing further aspects of the implement control system.

FIG. 5 shows another schematic of the implement control system 150 according to aspects of the present disclosure. The schematic shown in FIG. 5 is similar to that shown and described in FIG. 4. For example, the implement control system 150 shown in FIG. 5 includes an intelligent control 152 in the form of a display/CPU member. The display/CPU member is connected to an IPR 154. An Ethernet connection 162 can be utilized to connect the display to the implement IPR 156. The use of Ethernet connection allows for high speed, high band width transmission of information between the components. Ethernet protocol allows for high speed, high speed bandwidth wherein a large amount of data can be transmitted between two components connected via the Ethernet connection in a manner that has not to date been realized in the agricultural industry. Therefore, the use of the Ethernet in the implement control system 150 provides for a much greater transmission in communication of data in a high-speed manner. The IPR is shown to have three Ethernet connections extending therefrom. These include an Ethernet left 163, and Ethernet right 164 and Ethernet axillary 165. The Ethernet left 163 connections is showing the Ethernet connection to the left wing of a planter 110, and is shown to be connected to a number of IPNs 158 which are associated with the row units 140 attached to and or on the left wing of the planter. Similarly, the Ethernet right connection 164 is connected to a plurality of IPNs that are associated with a number of row units attached or associated with a right wing of the planter 110. However, it should be appreciated that the number of IPNs 158 utilized and the delegation of the right and left are for exemplary purposes only, and are should not be limiting to the present disclosure. Finally, the Ethernet axillary connection 165 is connecting the IPR 156 to a plurality of IPNs 158 associated with axillary functions of the planter 110. While two IPNs 158 are connected via the Ethernet axillary, it is to be appreciated that this is for exemplary purposes only, and is not to be limiting on the present disclosure either.

Therefore, for exemplary purposes, the Ethernet left connection 163 associated with the IPNs 158 can be described as follows. The IPNs 158 are connected to a number of sensors, motors, and other controls in which the IPNs 158 transmit information between each other and the IPR 156 in order to control functions of the components thereon. For example, one IPN 158 is connected to a seed meter motor 166, insecticide flow center 167, seed sensor 168, manual run button 169, insecticide motor control 170, and liquid fertilizer sensor 171. Such motor and sensors are generally associated with a row unit and/or seed meter of a planter. Therefore, the IPN 158 is connected to the components and operates with the IPR 156 in order to control the functionality of the various components. A different IPN 158 connected to the Ethernet left connection 163 includes connection to vacuum solenoids 184, work lights 185, vacuum sensors 186, work switches 187, and pneumatic down pressure (PDP) 188. Likewise, a different IPN 158 connected to the Ethernet right connection 164 includes connection to vacuum solenoids 184, work lights 185, vacuum sensors 186, work switches 187, and marker solenoids 189. These are also functions associated with the wing and control of components thereon. Therefore, the additional IPN 158 will include connections and control of the functions associated with these components. The Ethernet axillary connection 165 is shown to be connected to additional components. For example, the IPNs 158 associated with the Ethernet axillary connection 165 include components of wing wheel solenoids 172, axle solenoids 174, wing solenoids 175, field coils 176, alternator sensors 177, temperature sensors 178, air seed delivery controls 179, hitch solenoids 180, jump start controls 182 and fertilizer controls 183. Such controls, sensors, and the like are associated with other aspects of the planter and control thereof. This allows for the use of the planter and the acquisition of data associated with the varying controls.

Therefore, the IPNs 158 are in communication with the IPR 156 to provide the controls for the associated components of the IPNs 158. This will allow for the control of the planter in a higher speed and higher ban with manner, such that the controls will be passing a higher amount of data between the IPNs 158 and the IPR 156. Furthermore, the use of the implement control system 150 as shown and described will provide additional benefits and improvements. Such benefits may include a type of plug-n-play system. Currently, each row unit includes a node or control board that is specifically programmed for the location of the row unit in relation to the planter, type of seed meter used with the planter and other factors in which the node is specifically tailored to and tied down to a specific location. Aspects of the present disclosure allow for the IPNs 158 to be near universal and function to allow for the IPN 158 to be connected to an IPR 156 in which the IPN 158 will then become programmed to provide any number of functional capabilities. These functional capabilities can then be transmitted to the user display to allow for an operator to interact with the IPN 158 on how it should act, react or otherwise function in relation to the other components of the implement control system 150.

For example, the IPR 156 can be programmed during manufacture, as previously disclosed. This can include information related to the planter, such as number of row units, type of seed delivery mechanism, type of down force providing, type of pressure to the seed meters, and/or any other factors that can be varied according to a planting implement. The IPNs 158 can be attached to the planter wherein the IPR 156 can transmit this information to the IPN 158 via the high speed, high bandwidth Ethernet connections to provide information related to the planter to the IPN 158. The IPN 158 can then recognize other components connected thereto and can provide functional options to an operator via the user display to allow for the operator to input desired outcomes, controls, parameters, or other inputs to allow the IPN 158 to actively control components connected thereto based on said inputs. This quick plug-n-play style programming allows for the IPNs 158 to be essentially un-programmed until connected to an IPR number. The blank programming of the IPN 158 will allow for the quick association of the IPN 158 with components connected thereto to allow for the control of said components regardless of any preprogramming. This is advantageous in that it saves time, cost, and other problems associated with specifically programming a control board with the functionality of components that it will be attached to.

Figure 6:
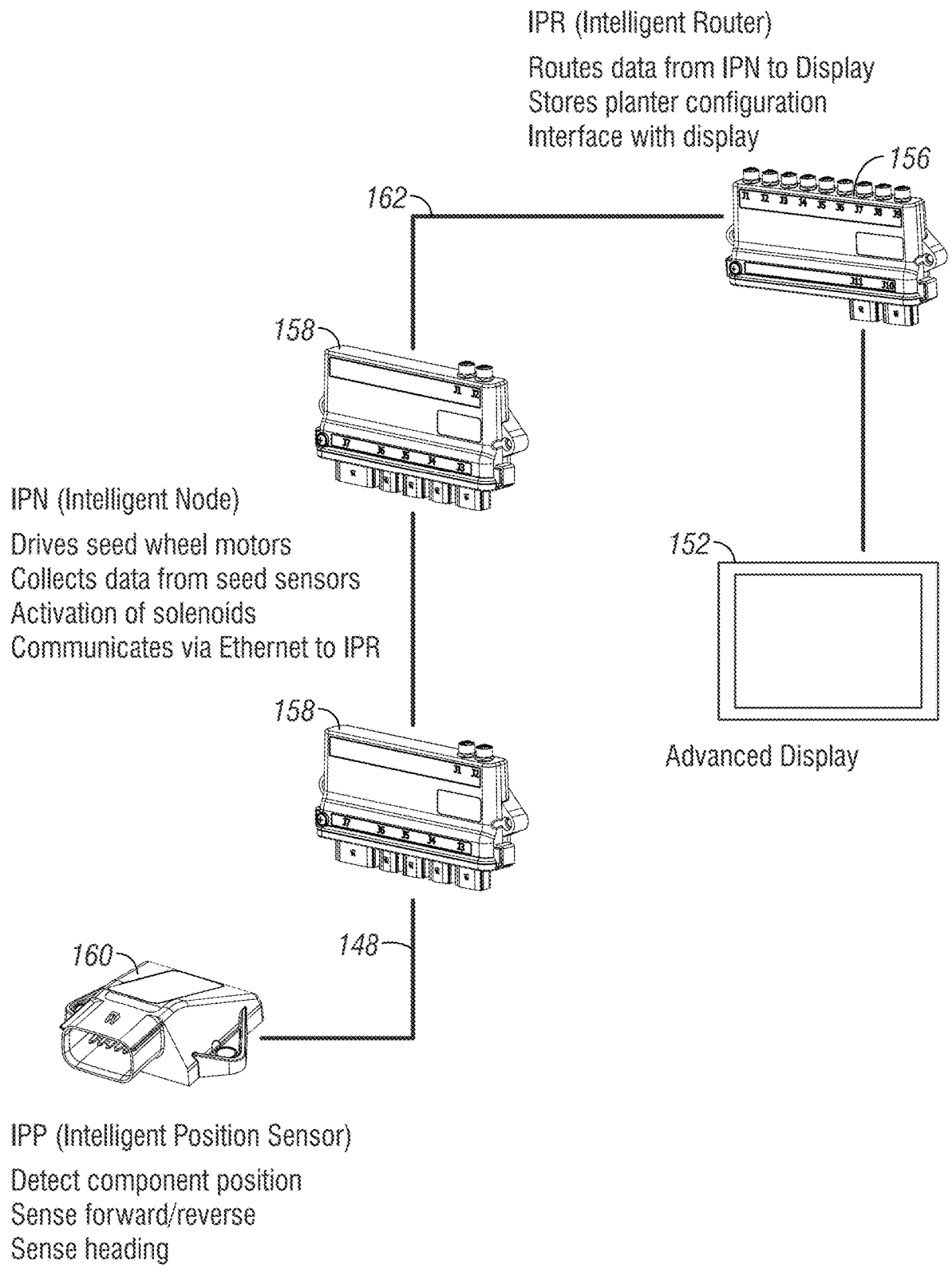
FIG. 6 is a diagram showing components of the implement control system.

FIG. 6 shows another diagram of the implement control system explaining some of the components thereof. As disclosed, an intelligent control 152 can take the form of a tablet, monitor, user interface, or other computing device. As shown in FIG. 6, the display can be a touch screen monitor providing a user interface with inputs and outputs and having an Ethernet input with a mounting bar dock. As mentioned, if the required input and outputs are not associated with a display unit, an IPR 156 or other routing mechanism that does include the desired input and output connectivity can be associated with the display unit. The intelligent control 152 is connected via Ethernet connection 162 to an IPR 156. According to aspects of the disclosure, at least one, or one or more IPRs 156 may be used with each planter. For example, one IPR 156 may be used with a planter according to some embodiments. However, additional embodiments include a planter with more than one IPR 156, such as two, three, or more. IPR route data from an IPN 158 to the display, stores planter configuration information, interfaces with the display, and can provide other controlling or otherwise be the brain function of an implement. Connected to the IPR via Ethernet connection is a plurality of IPNs 158. The IPNs 158 are connected to components of a planter or other mechanism to control said components. For example, the IPNs 158, one connected to a planter, can drive seed motors, collect data from seed sensors, activate solenoids, and or otherwise communicate with the IPR 156 via Ethernet connection. Also shown in the diagram of FIG. 6 is a IPP 160. A plurality of IPP 160 can be positioned throughout the planter to provide positioning data for the planter and components thereof. The IPP 160 can detect component position, sense forward and reverse direction, and otherwise sense heading of the planter and/or components thereof. For example, when an IPP 160 is positioned on a marker 133, 136, the information collected by the IPP 160 can provide substantially exact location of the marker 133, 136 between a stored and a use configuration. This is highly advantageous over the current setting which and only allows knowledge or information that the marker 133, 136 is being lowered or raised, but does not show exact configuration thereof. The IPP 160 can also collect additional information and be an inertial unit that can provide highly accurate location information such that the data can be collected during planting to provide location information related with an event. Such information can be associated with the planting of a seed, the location of an obstacle, the location of start and ending, and generally any other location or directional information that may be associated with an event.

Internal mechanical and electrical components which can, for example, make up the IPR 156, IPN 158, and IPP 160 are described in co-owned pending patent application Ser. No. 15/800,954, which is herein incorporated by reference in its entirety.

Figure 7:
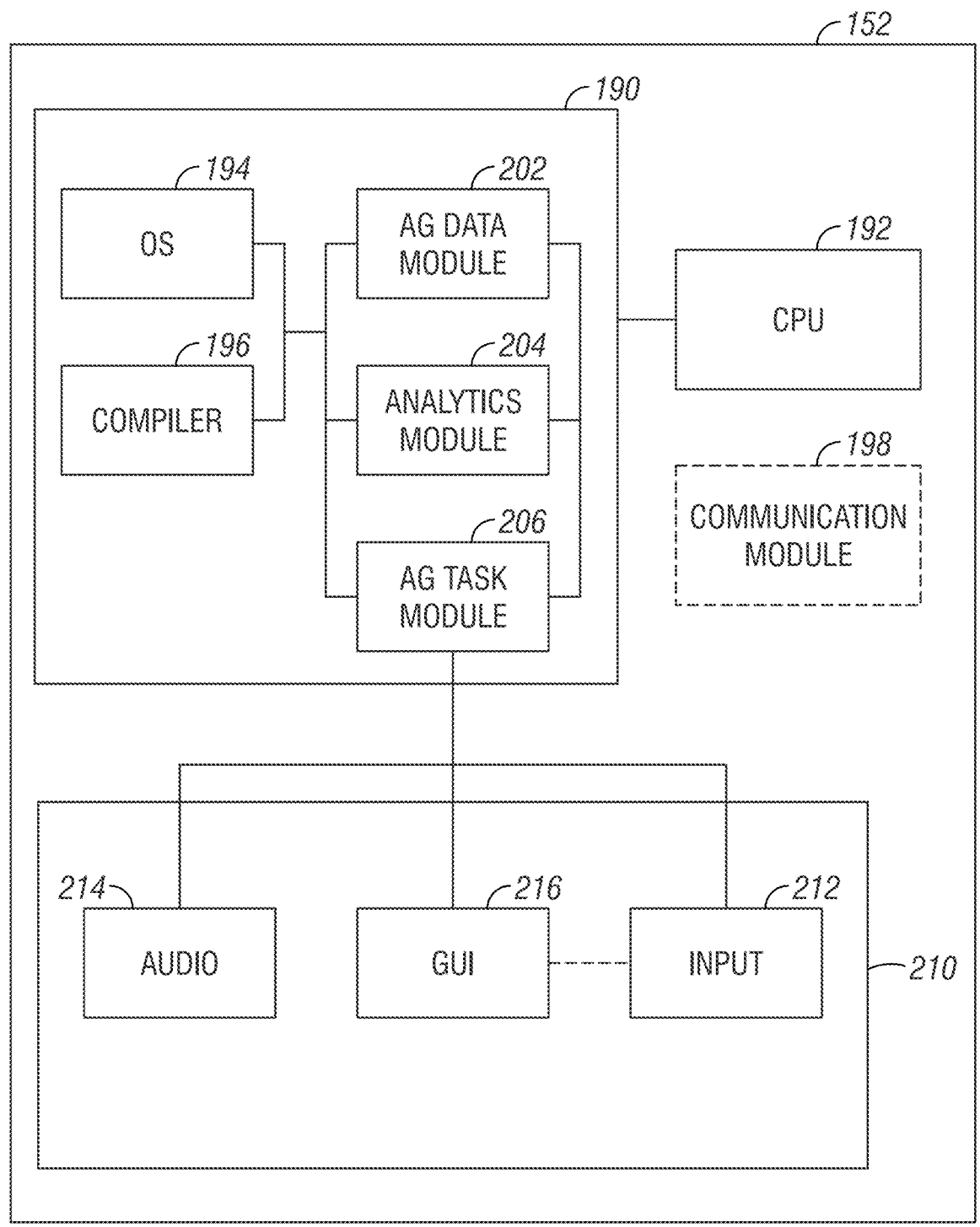
FIG. 7 illustrates, schematically, a hardware environment emphasizing computing components of an exemplary intelligent control, such as a tablet with a touch-screen display.

FIG. 7 illustrates, schematically, a hardware environment emphasizing computing components of an exemplary intelligent control 152, such as a tablet or other type of display unit with a touch-screen display.

The intelligent control 152 includes memory 190, which has a program storage area and/or data storage area. The memory 190 comprises either read-only memory ("ROM", an example of non-volatile memory, meaning it does not lose data when it is not connected to a power source) or random access memory ("RAM", an example of volatile memory, meaning it will lose its data when not connected to a power source). Examples of volatile memory include static RAM ("SRAM"), dynamic RAM ("DRAM"), synchronous DRAM ("SDRAM"), etc. Examples of non-volatile memory include electrically erasable programmable read only memory ("EEPROM"), flash memory, hard disks, SD cards, etc.

A central processing unit 192, such as a processor, a microprocessor, or a microcontroller, is connected to the memory 190 and is capable of executing software instructions that stored in the memory 190. The central processing unit 192 is the electronic circuit which performs operations on some external data source, such as the memory 192 or some other data stream. The central processing unit 192 performs the basic arithmetic, logic, controlling, and input/output ("I/O") operations specified by the instructions.

As shown in FIG. 7, aspects of the intelligent control 152, including computer hardware and software resources of the modules 202, 204, 206, are managed by an operating system 194 stored in the memory 190. More particularly, a compiler 196 allows a software application written in a programming language such as COBOL, C++, FORTRAN, or any other known programming language to be translated into code to be read by the central processing unit 192. After completion, the central processing unit 192 accesses and manipulates data stored in the memory of the non-transitory computer readable medium using the relationships and logic dictated by the software application and generated using the compiler 196.

In one embodiment, the software application and the compiler are tangibly embodied in the intelligent control 152. When the instructions are read and executed by the central processing unit 192, the intelligent control 152 performs the steps necessary to implement and/or use the invention. A software application, operating instructions, and/or firmware (semi-permanent software programmed into read-only memory) may also be tangibly embodied in the memory 190, agricultural data module 202, analytics module 204, ag task module 206, and/or data communication devices (e.g., communication module 198), thereby making any software application disclosed herein a product or article of manufacture according to the invention.

The communications module 198 is capable of connecting the intelligent control 152 to a network 200, such as a cloud-computing network 200A, and/or systems of interconnected networks, such as the Internet 200B. In some embodiments, the intelligent control 152 and/or communications module 198 can include one or more communications ports such as Ethernet, serial advanced technology attachment ("SATA"), universal serial bus ("USB"), or integrated drive electronics ("IDE"), for transferring, receiving, or storing data. In other embodiments, a software licensing and delivery model usable in connection with the cloud-computing network 200A can be software as a service ("SaaS"), infrastructure as a service ("IaaS"), platform as a service ("PaaS"), desktop as a service ("DaaS"), a managed service provider, mobile backend as a service ("MBaaS"), or information technology management as a service ("ITMaaS").

The agricultural data module 202 includes the necessary hardware and/or software components and/or is electrically connected to other computing components such that the intelligent control 152 can more efficiently store, manage, and transmit agricultural data 208.

Figure 8:
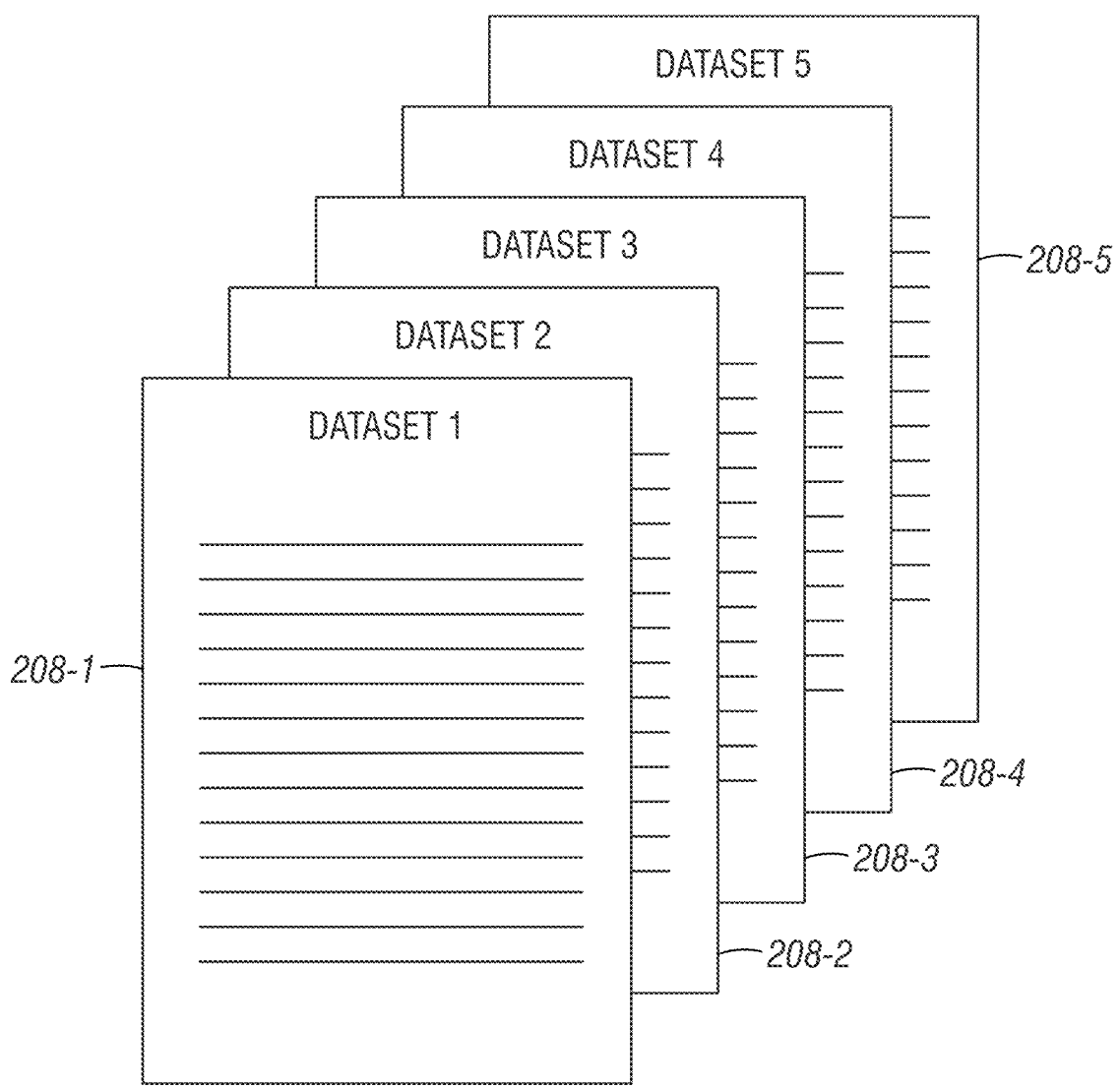
FIG. 8 depicts layered data, including that data which is storable in database(s) and/or accessible by way of an agricultural data module, so as to facilitate viewing, analyzing, and/or performing agricultural tasks with said data.

As shown in FIG. 8, the agricultural data 208 can be categorized and/or separated into layers 208-1 . . . 208-N. For example, a first layer 208-1 of the agricultural data 208 can comprise planting information such as (a) an instruction to plant or not to plant; (b) seed and/or fertilizer type; (c) seed spacing; and (d) depth of planting. For example, a second layer 208-2 of the agricultural data 208 can comprise planting efficiency information such as (a) singulation (including skips and/or doubles); (b) fertilizer rates; (c) insecticide rates; (d) ground contact rates; (e) downforce rates; and (f) population rates. For example, a third layer 208-3 of the agricultural data 208 can comprise time, geospatial, and/or weather forecast information such as (a) time of day; (b) air temperature; (c) season; (d) a weather condition; and/or (e) geospatial coordinates. For example, a fourth layer 208-4 (not shown) of the agricultural data 208 can comprise vehicle information such as (a) heading, such as a direction or bearing, of the implement and/or tow vehicle; (b) velocity or speed of the implement and/or tow vehicle; (c) fuel level of one or more fuel tanks on the implement and/or tow vehicle; and/or (d) technical capabilities of the implement and/or tow vehicle. For example, a fifth layer 208-5 (not shown) of the agricultural data 208 can comprise soil information such as (a) moisture content; (b) compaction; (c) ground temperature; (d) elevation; (e) depth; (f) slope of terrain; and/or (g) soil composition. Symbols and/or values for the agricultural data 208 can be displayed via graphical user interface 216 (as particularly shown in FIGS. 14-16). The agricultural data 208 can be designated as historical data, temporary data, live data, anticipated data, predictive data, or the like.

Figure 9:
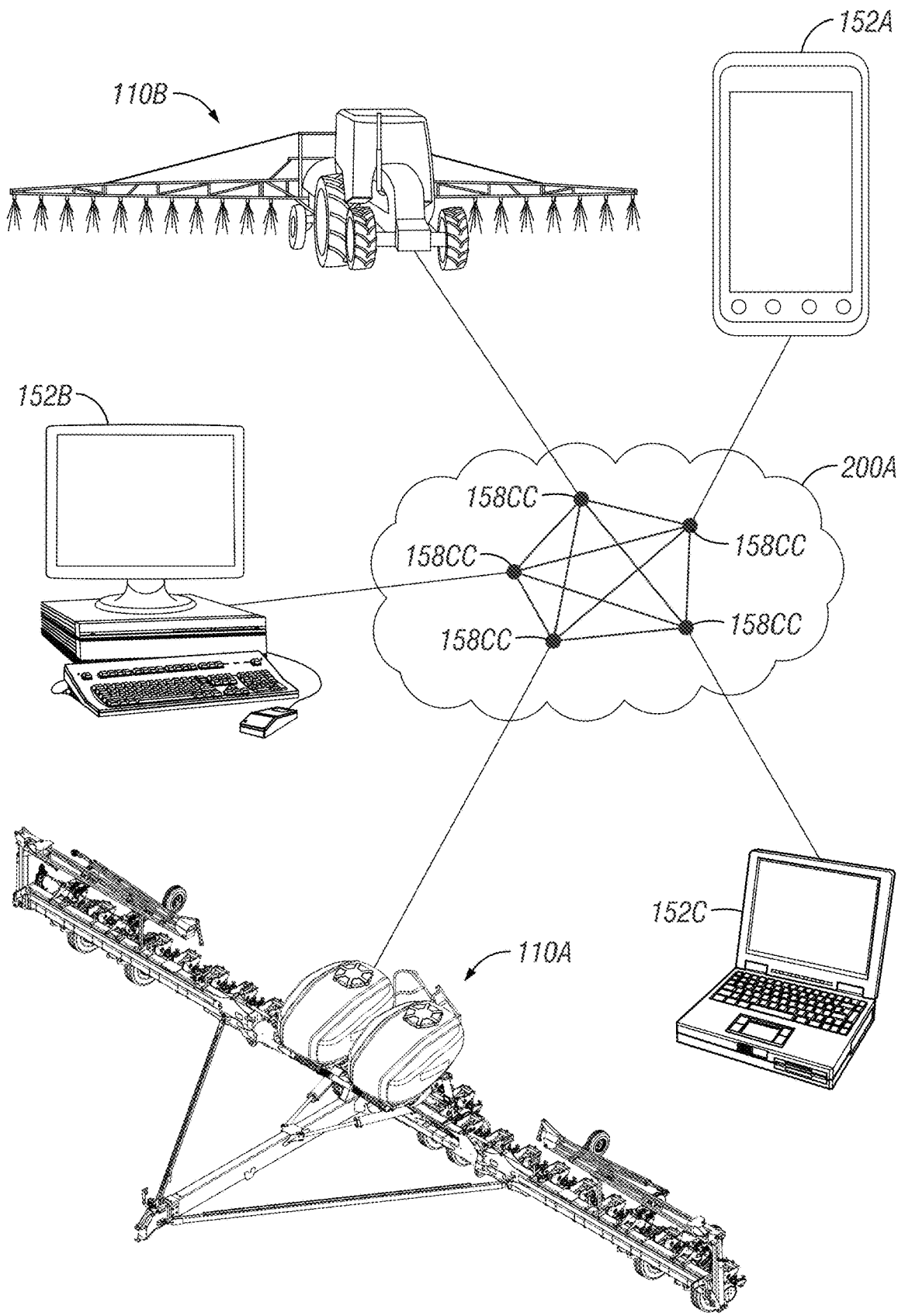
FIG. 9 exemplifies a cloud computing environment.
Figure 10:
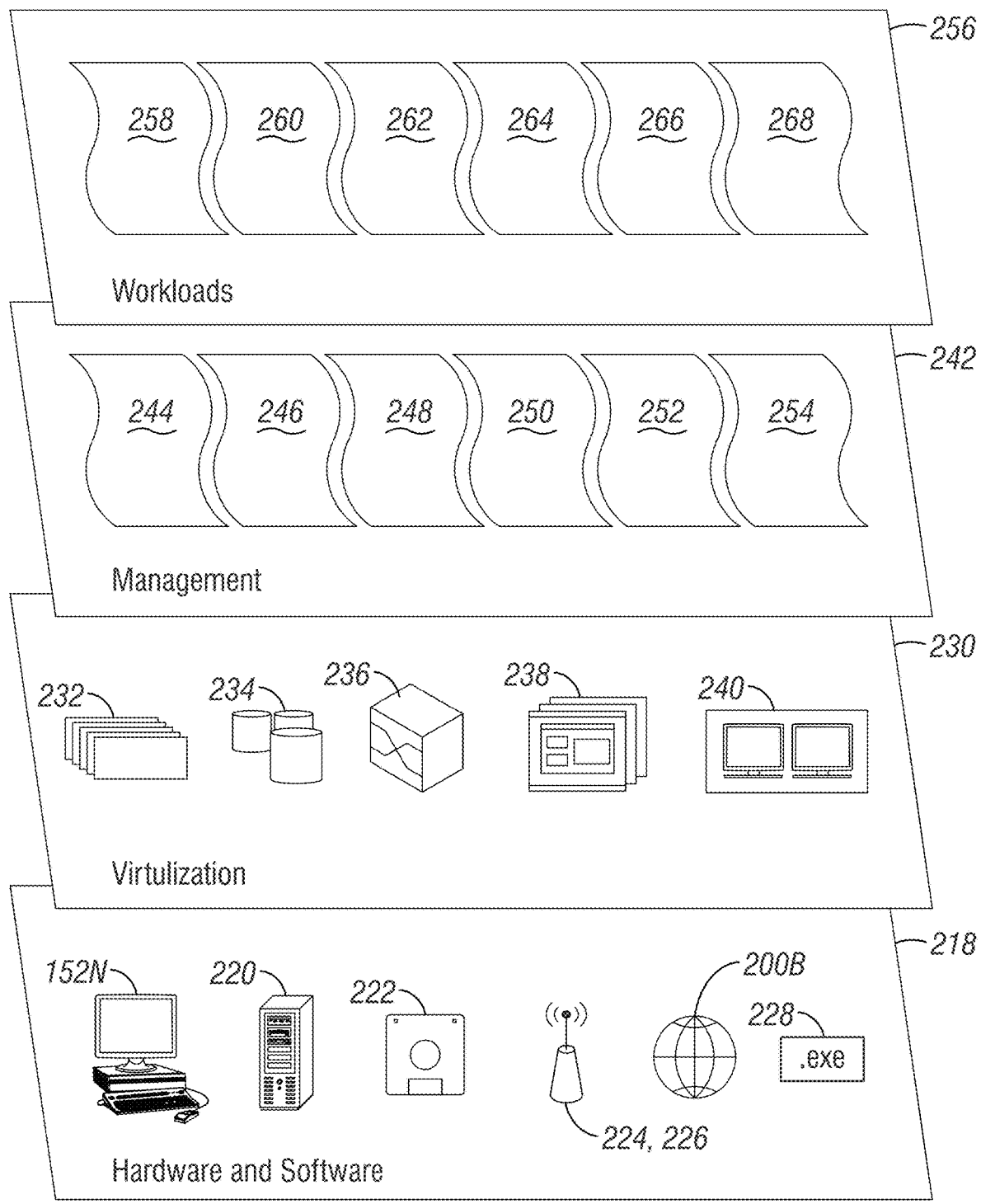
FIG. 10 exemplifies a cloud computing node.

Referring back to FIG. 7, the agricultural data module 202 can work in tandem with the memory 190 to store and/or access the agricultural data 208. The agricultural data module 202 can also work in tandem with the communication module 198 to communicate agricultural data 208 among several different computing devices 152A-152N, which can be located on remote agricultural implements 110, and even across agricultural implements of varying types 110A-110N, as shown in FIG. 9. The agricultural data module 202 can also work in tandem with the communication module 198 to communicate agricultural data 208 among several distinct networks 200, as shown in FIG. 10. A non-exhaustive list of exemplary networks include: a wide area network ("WAN") such as a TCP/IP based network or a cellular network, a local area network ("LAN"), a neighborhood area network ("NAN"), a home area network ("HAN"), and a personal area network ("PAN"). Some networks 200 will allow communication between the communication module 198 and the central location during moments of low-quality connections. Communications through the networks 200 can be protected using one or more encryption techniques, such as those techniques provided in the IEEE 802.1 standard for port-based network security, pre-shared key, Extensible Authentication Protocol ("EAP"), Wired Equivalent Privacy ("WEP"), Temporal Key Integrity Protocol ("TKIP"), Wi-Fi Protected Access ("WPA"), and the like.

For example, and with respect to FIG. 9, an illustrative cloud computing environment 200A includes one or more cloud computing nodes 158CC with which local computing devices used by cloud consumers. The computing devices can include, for example, personal digital assistant ("PDA") or cellular telephone 152A, desktop computer 152B, laptop computer 152C, and/or any suitable other type of computer systems 152N. Cloud computing nodes 158CC will communicate with one another and may be grouped physically or virtually, in one or more networks, such as private, community, public, or hybrid clouds as described hereinabove, or a combination thereof. This allows cloud computing environment 200A to offer infrastructure, platforms and/or software as services for which a cloud consumer does not need to maintain resources on a local computing device. It is understood that the types of computing devices 152A-N shown in FIG. 9 are intended to be illustrative only and that computing nodes 158CC and cloud computing environment 200A can communicate with any type of computerized device over any type of network and/or network addressable connection (e.g., using a web browser).

Referring now to FIG. 10, a set of functional abstraction layers provided by cloud computing environment 200A (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 218 includes hardware and software components. Examples of hardware components include: implement computing devices 152N; servers 220; storage devices 222; networking components, including network towers 224 and network signals 226; network connections, including those to the Internet 200B; and software components 228, including network application server software and database software. Network signals 226 can employ any of a variety of communication protocols, such as Wi-Fi, Bluetooth, ZigBee, near field communication ("NFC"), etc., although other types of network signals 226 are possible and are contemplated herein.

Virtualization layer 230 provides an abstraction layer from which the following examples of virtual entities may be provided: virtual servers 232; virtual storage 234; virtual networks 236, including virtual private networks; virtual applications and operating systems 238; and virtual clients 240.

In one example, management layer 242 may provide the functions described below. Resource provisioning 244 provides dynamic procurement of computing resources and other agricultural resources that are utilized to perform tasks within the cloud computing environment. Finances 246 provide cost tracking as computing and agricultural resources are utilized during operation of an agricultural implement and connected or related computer systems. In one example, these resources may include application software licenses. Security 248 provides identity verification for cloud consumers and tasks, as well as protection for data and other resources. User portal 250 provides access to the cloud computing environment for consumers and system administrators. Service level management 252 provides cloud computing resource allocation and management such that required service levels are met. Service level agreement ("SLA") planning and fulfillment 254 provide pre-arrangement for, and procurement of, cloud computing resources for which a future requirement is anticipated in accordance with an SLA.

Workloads layer 256 provides examples of functionality for which the cloud computing environment 200A may be utilized. Examples of workloads and functions which may be provided from this layer include: mapping and navigation 258; software development and lifecycle management 260; troubleshooting 262; data analytics processing 264 via analytics module 204; agricultural task processing 266; and a workload 268 to provide access to databases and nomograms to facilitate the computation and/or other handling of agricultural data. For example, the workload 268 may provide an application programming interface ("API") to obtain information relating to those risks which may delay, prevent, or nullify efficient planting.

The agricultural data module 202 can also work in tandem with an analytics module 204 and/or user interface 210 to create more agricultural data 208, manipulate existing agricultural data 208, and/or display agricultural data 208.

The analytics module 204, in particular, can facilitate (i) amalgamation; (ii) separation, (iii) calculation, (iv) prediction, (v) instruction relating to agricultural tasks, (vi) comparisons, (vii) conversions, (viii) designation, (ix) reevaluation, (x) replacement, and/or (xi) deletion: of/with agricultural data 208. The analytics module 208 can perform such functions automatically in response to receiving agricultural data 208 or after a user prompts the analytics module 204 to perform a specific function.

The user interface 210, in particular, is how the user interacts with the intelligent control 152 and modules contained therein. The user interface 210 can be a digital interface, a command-line interface, a graphical user interface ("GUI") 216, any other suitable way a user can interact with a machine, or any combination thereof. For example, the user interface 152 can include a combination of digital and/or analog input/output devices or any other type of input/output device required to achieve a desired level of control and monitoring of the agricultural data 208 and/or agricultural tasks. Input(s) received from the user interface 210 can be sent to a microcontroller to control operational aspects of the intelligent control 152. Examples of input devices 212 include computer mice, keyboards, touchscreens, knobs, dials, switches, buttons, etc. Examples of output devices include audio speakers 214, displays for graphical user interfaces 216, light emitting diode (LED) indicators, etc. In at least one embodiment, graphical user interfaces 216 are capable of displaying agricultural data 208 sensed in real time on a map.

Figure 11:
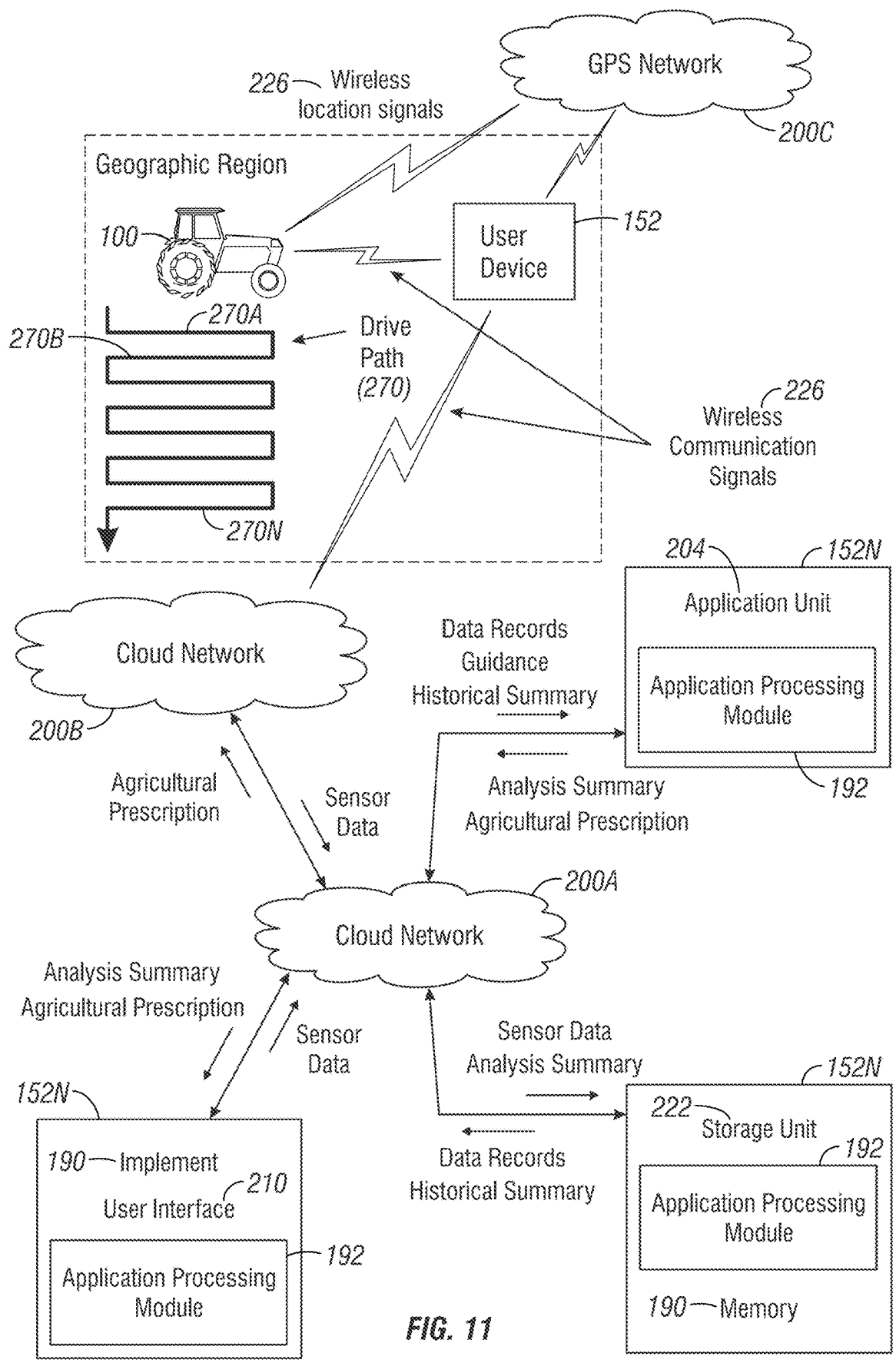
FIG. 11 illustrates the communication of information, such as a drive path, for an associated geographic region.

FIG. 11 illustrates, for exemplary purposes only, a computerized system that can connect to a global positioning system (GPS) network 200C to enhance mapping and navigation 258 of a navigation system located an agricultural implement 110. GPS is owned by the United States and uses satellites to provide geolocation information to a GPS receiver. GPS, and other satellite-based radio-navigation systems, can be used for location positioning, navigation, tracking, and mapping.

More particularly, computerized information including that which represents an actual drive path 270 for an associated geographic region 272 can be communicated among several intelligent controls 152 in remote locations. The tractor 100 and/or agricultural implement 110 can be located within the geographic region 272.

The tractor 100 and/or agricultural implement 110 determine location information based on receiving wireless location network signals 226 from a GPS network 200C and captured sensor data (e.g., farming tractor accelerometer data, soil moisture levels, soil chemical content, etc.) along the drive path 270 for at least a portion of the geographic region 272. The drive path 270 includes a geographic path of the tractor 100 and/or agricultural implement 110 when operating within the geographic region 272. The drive path may include two or more sub-drive paths 270A-270N. For example, a first sub-drive path 270A traverses the geographic region 272 from left to right and a second sub-drive path 270B traverses the geographic region 272 from right to left. The intelligent control 152 of the tractor 100 and/or agricultural implement 110 may monitor the drive path 270 (e.g., passively monitoring along a path taken by the tractor 100 and/or agricultural implement 110) or may provide the drive path 270 (e.g., where an agricultural prescription includes control information to invoke operation of the tractor 100 and/or agricultural implement 110 along the drive path 270). The drive path 270 may be obtained by the intelligent control 152 in a variety of ways including one or more of determining a specific drive path in accordance with the agricultural prescription, utilizing a predetermined drive path (e.g., the drive path for geographic region 272 from a list), generating a random drive path, utilizing a previous drive path associated with geographic region 272 (e.g., obtaining a historical summary), and receiving the agricultural prescription that includes control information associated with the drive path 270. For example, the intelligent control 152 can utilize the drive path 270 from the agricultural prescription while a tractor 100 and tiller 110C are tilling the soil of at least a portion of the geographic region 272.

Having captured the sensor data, the intelligent control 152 and communications module 198 located therein can send, using, for example, Bluetooth wireless communication signals, the captured sensor data to the agricultural implement 110. The intelligent control 152 and communications module 198 located therein can also send, utilizing, for example, long-term evolution (LTE) wireless communication signals, the captured sensor data via the Internet 200B to a cloud-based network 200C (other networks are possible) with a cloud-based storage unit 222. The central processing unit 192 associated with the intelligent control 152N of the cloud-based storage unit 222 processes the captured sensor data to produce data records for storage in the memory 190 of the cloud-based storage unit 222. Alternatively, a removable memory of the intelligent control 152N is utilized to temporarily store the captured sensor data. The removable memory is operably coupled to the cloud-based storage unit 222 to facilitate transfer of the captured sensor data to the central processing unit 192 of the cloud-based storage unit 222. For example, the removable memory device is directly interfaced to the cloud-based storage unit 222. As another example, the removal memory device is interfaced to the tractor 100 and/or agricultural implement 110. The intelligent control 152 of the tractor 100 and/or agricultural implement 110 facilitates sending, via the networks 200, the captured sensor data to the cloud-based storage unit 222.

The intelligent control 152 of the tractor 100 and/or agricultural implement 110 can receive via user input devices 212 a request for an analysis and generation of an agricultural prescription. The central processing unit 192 and data analytics module 204 of the same or another (as shown at the right of FIG. 11) intelligent control 152 generate guidance based on the request and other desired characteristics (e.g., a crop list, a time frame, equipment availability, chemical availability, and soil management operational ranges available) of the agricultural prescription for the geographic region 272. The intelligent control 152 sends, via the networks 200, the guidance to the agricultural implement 110. The central processing unit 192 of the agricultural implement 110 obtains the data records for the geographic region 272 from the cloud-based storage unit 222 based on the guidance. The central processing unit 192 and agricultural data module 204 may further obtain historical summaries with regards to the geographic region 272 based on the guidance.

Having obtained the guidance, the data records, and/or the historical summaries, the central processing unit 192 and data analytics module 204 of the intelligent control 152 produce an analysis based on the data records and/or the historical summaries. The central processing unit 192 and data analytics module 204 of the agricultural implement 110 processes the analysis in accordance with the guidance and/or the historical summaries to produce an analysis summary. The agricultural data module 202 of the intelligent control 152 associated with the agricultural implement 110 facilitates storage of the analysis summary by the cloud-based storage unit 222 to enable subsequent recovery of the historical summaries that includes the analysis summary.

Having produced the analysis summary, the central processing unit 192 and analytics module 204 of the intelligent control 152 process the analysis summary in accordance with the guidance and the historical summaries to produce the agricultural prescription. The agricultural prescription may further include a plurality of agricultural related tasks, where each step includes one or more agricultural tasks, and for each agricultural task, one or more required preconditions to execute the agricultural task. Such steps may be executed by the central processing unit 192 and agricultural task module 206 in parallel, in series, and in a combination in accordance with the preconditions for execution. The agricultural task to be performed an agricultural task can be any one or more of the following: (a) planting; (b) tilling; (c) baling; (d) harvesting; (e) spraying; (f) transporting; (g) cultivating; (h) harrowing; (i) plowing; (j) fertilizing; (k) broadcasting; (l) loading; and (m) unloading.

The preconditions for execution of the agricultural task includes required conditions to enable execution of the agricultural task (e.g., when to execute the agricultural task) including one or more of a current date match, a current date within a date range, a time within a time range, a current data sensor value within a desired range (i.e., a current temperature within a temperature range), an actuator readiness state, distance from a previously executed step (i.e., seed dispensing population of seeds per acre), and elapsed time since a previously executed step). For example, a precondition for planting a short growing seed at a later date has occurred within a growing season.

Each agricultural task includes what to do and how to accomplish the agricultural task. As such, some agricultural tasks will include dispensing seed and/or other materials (i.e., a gas, a liquid, a slurry, a solid), how to dispense the material (i.e., distance between dispensing points, distance between parallel dispensing tracks), collect sensor data, and manipulate other objects (e.g., management practices including: performance of other agricultural tasks, avoiding obstructions, irrigation control, sunlight control, etc.). Liquids can include chemical compounds such as fertilizers and pesticides. The pesticides include one or more of insecticides (e.g., insect killers), herbicides (e.g., weed killers), and fungicides (e.g., to kill or inhibit fungi). The solids include one or more of seed, fertilizer powder, and manure. The seeds include a plurality of hybrid seed types and may vary from growing season to growing season.

Figure 12:
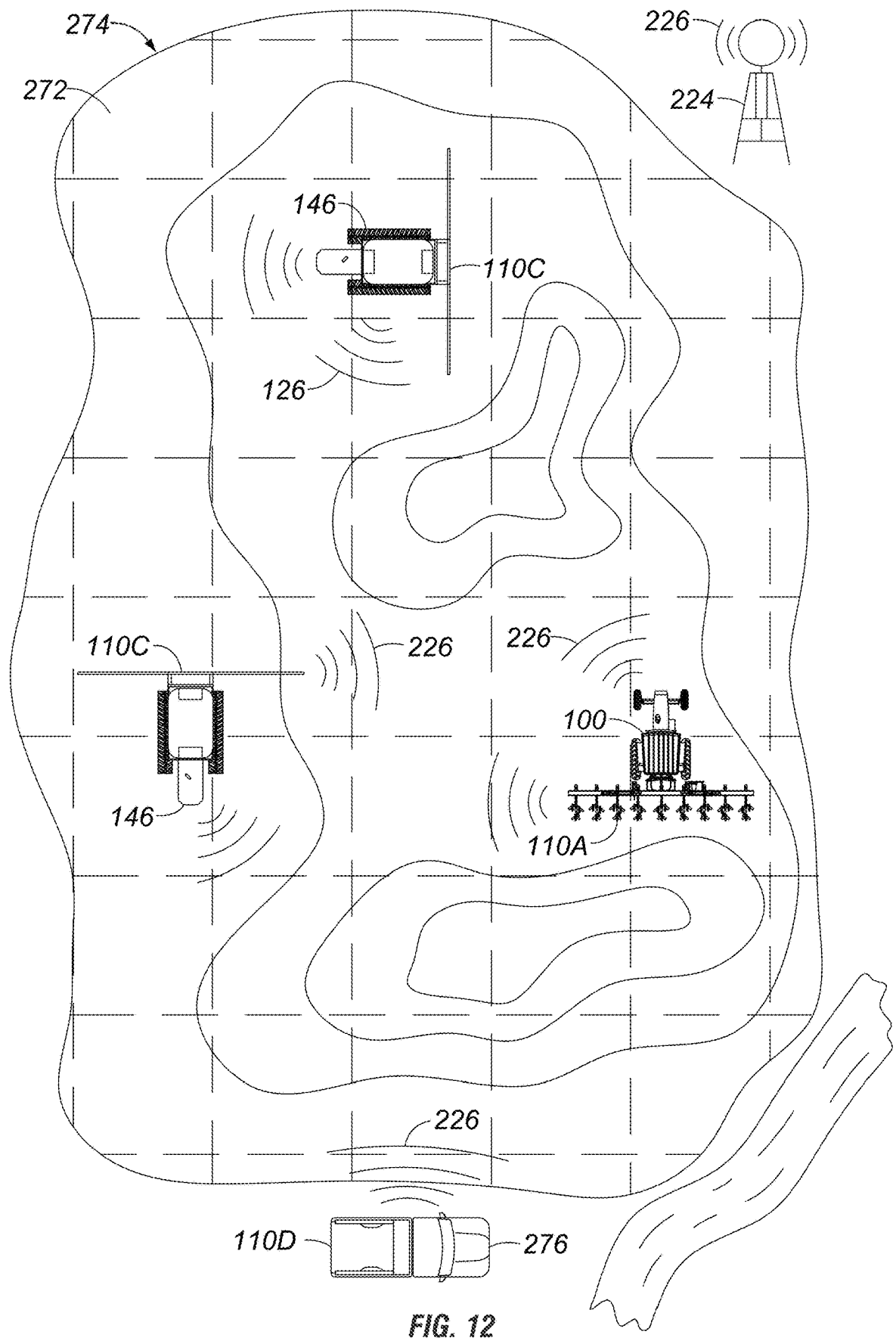
FIG. 12 shows multiple planters operating in a field with the field parsed into geographic regions.

FIG. 12 is a schematic diagram showing multiple units in a field 274. As shown in FIG. 12, a field 274 may include a first tug unit 146 attached to a first tiller 100C, a second tug unit 146 attached to a second tiller 100C, and a tractor 100 attached to a tractor planter 110A. Furthermore, there can a truck 276 towing a storage bin 100D shown outside the field 274. The first and second tug units 164, as well as the tractor 100 are performing an operation within the field. The use of the multiple vehicles in the field at the same time will reduce the amount of time to complete the operations.

In order to ensure that tractors 100, tug units 146, and/or a truck 276 do not overlap one another or otherwise run into one another, the vehicles emit network signals 226, which can be communicated and transmitted between each other. The network signals 226 can include a vast amount of information. For example, the network signals 226 can communicate the location of the units relative to one another as well as relative to the location in the field 274. The network signals 226 can also communicate any alerts, warnings, status updates, or other actions that may be occurring. For example, alerts can be sent where a unit is low on material, a unit is damaged, an obstruction is detected, a general status of soil conditions, trash build up, weed concentration, and/or the like is updated, etc.

Furthermore, FIG. 12 shows a tower 224 emitting a network signal 226. The tower 224, which could be one of many towers around the field, can provide additional location determining aspects for the field 274. The height and/or position of the tower 224 may increase the efficiency of the communication between the actors in the field. The tower 224 can also communicate to another field or to a master module located at a different location as to the status, alerts, warnings, or other data obtained by the vehicles in the field. In addition, it is contemplated that the agricultural data 208 from the network signals 226 can be stored for future purposes. For example, as the units operate in the field 274, they can obtain data, such as field conditions to prepare future planting schedules and/or maps.

Figure 13:
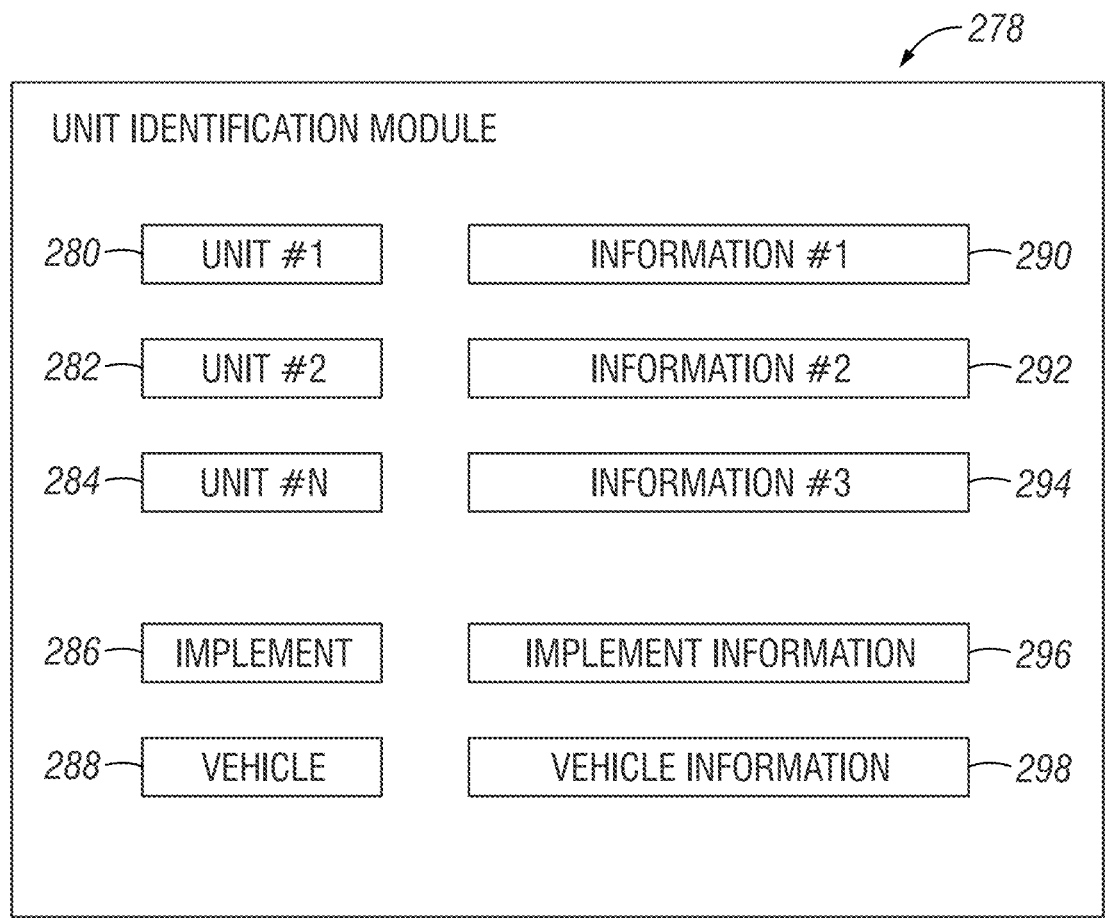
FIG. 13 is a diagram of a master module for use with an agricultural system having several agricultural implements, vehicles, and/or units.

FIG. 13 is a diagram of an example of a unit identification module 278 for use with the system including multiple vehicles and/or units, such as those disclosed in FIG. 12. The unit identification module 278 can be located on the tractor 100 of FIG. 1 and/or included with the intelligent control 152 of FIG. 7. The unit identification module 278 shown includes information for identifying the units. For example, in FIG. 13 the unit one identifier is shown in box 280, unit two is shown in box 282, and unit N is shown in box 284, where N is used to indicate the total (any) number of units in the field 274. Implement identification for the tractor containing the unit identification module 278 can be shown in box 286 and vehicle identification can be shown in box 288. Information for each of the units can be shown in boxes 290, 292, 294, 296, 298. Such information may include, but is not limited to, the status of the unit and/or implements connected thereto, location of the units, alerts or warnings associated with the units, field conditions, seed conditions, or the like. Such information may include the rate of planting, the amount of down force provided for each implement, the soil conditions, seed conditions, amount of remaining material, type of spraying, amount of spraying, moisture content, or generally any other type of information that may be useful for any of the agricultural based operations, as disclosed. In addition, the information boxes may include warnings or alerts that can flash or otherwise provide notice to the unit identification module 278. The amount and type of information disclosed in the unit identification module 278 is generally limitless. Furthermore, the unit identification module 278 or the system in general may include memory for storing data. The data could be recalled by the unit identification module 278, such as in a future planting or harvesting year to indicate choices or other information.

Safety elements can be included, such as redundant and independent safety systems that prevent the units from colliding and/or double planting areas in the field 274. These can include, but are not limited to, vehicle-mounted emergency stop buttons, safety handheld remotes, autonomous lockout, as well as other lockout mechanisms. For example, a battery-powered, safety handheld remote transmitter can be provided with each unit. The safety handheld remote includes an emergency stop button that allows an operator to perform an emergency stop remotely over a limited distance, as long as the remote is within communication range of the tractor 100. The safety handheld remote emergency stop button halts only the unit controlled by the remote. A run/pause switch that switches the units between autonomous and manual (non-autonomous) operation can also included, in embodiments where autonomous units are used.

Figure 14:
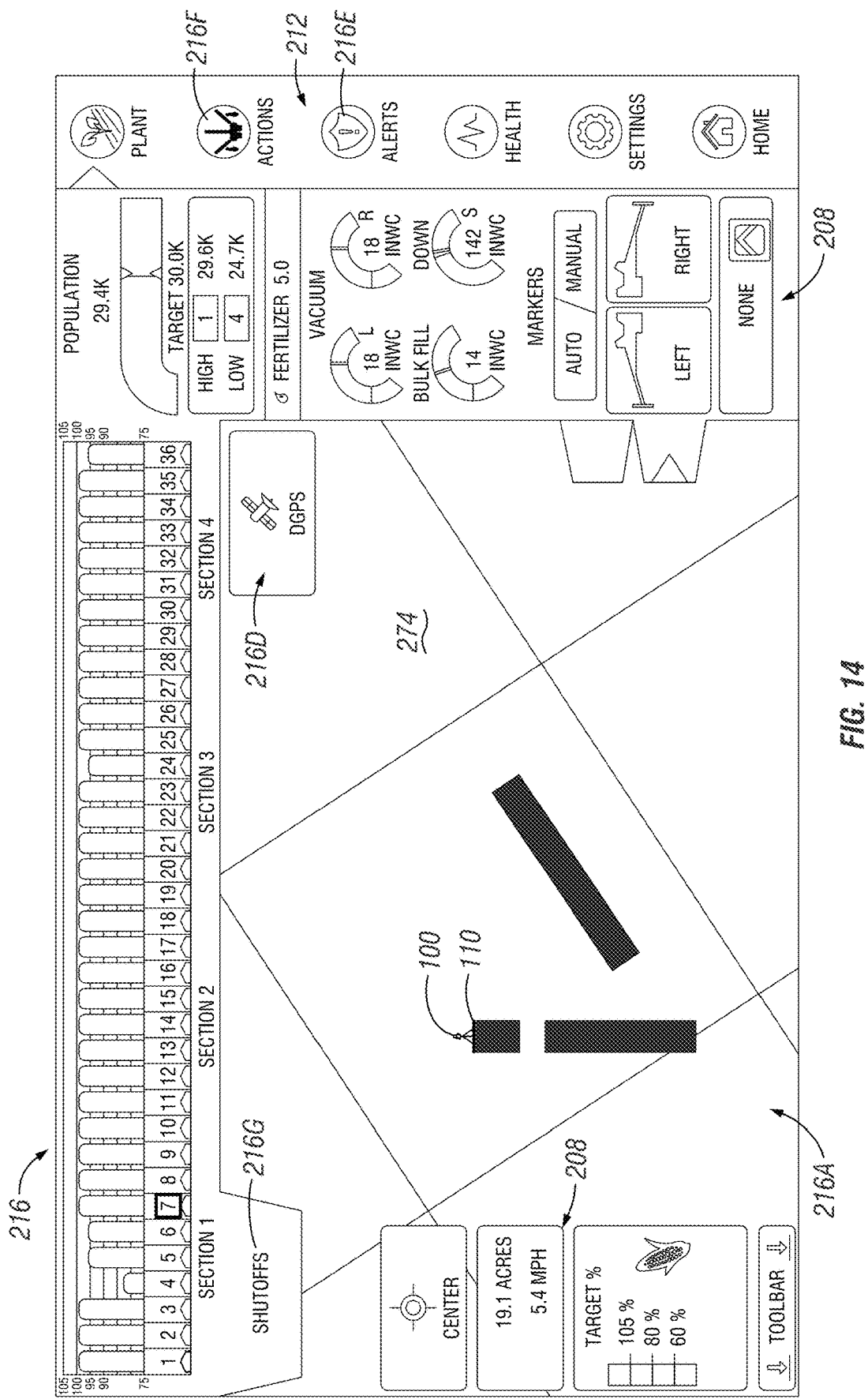
FIG. 14 displays a graphical user interface depicting a planter moving through a field.
Figure 15:
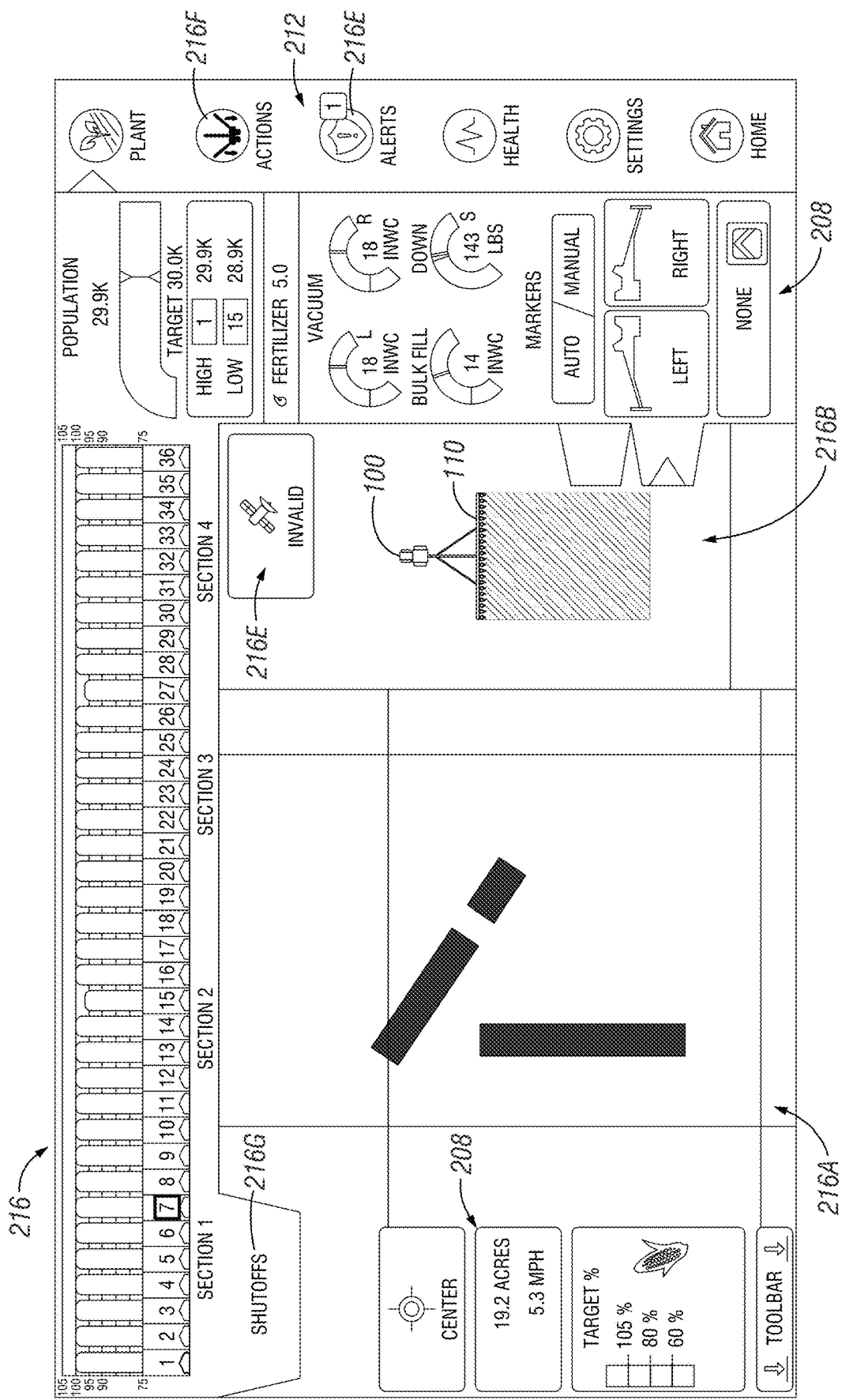
FIG. 15 displays a graphical user interface depicting a "hallway view" which shows aspects of planting during a period of unavailability.
Figure 16:
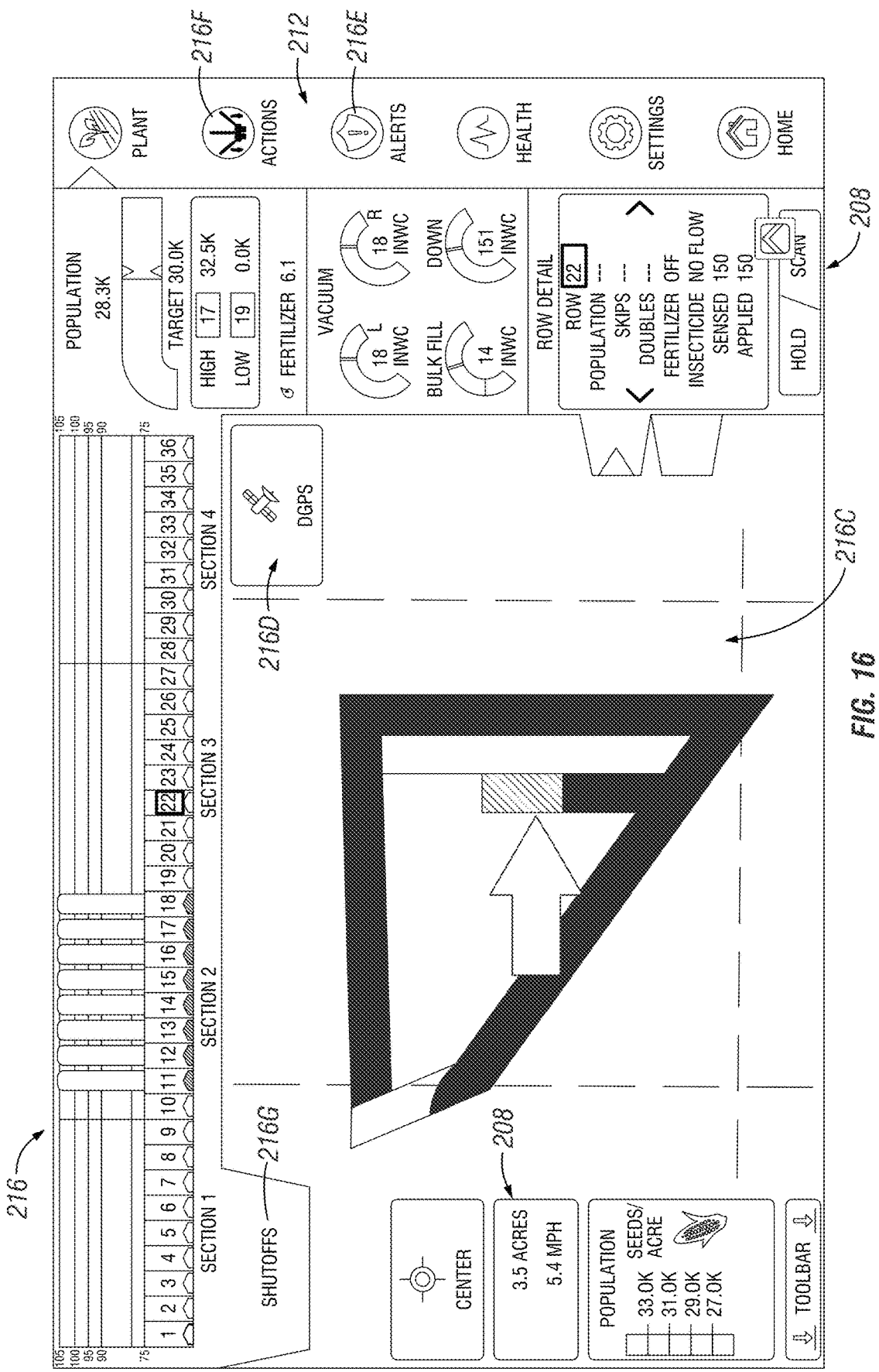
FIG. 16 displays a graphical user interface depicting the use of agricultural data to predict at least one aspect of an agricultural task performed during a period of unavailability.

Using the technical components of FIGS. 1-13, the invention is thus able to provide an operator of an agricultural vehicle with a more facile user experience, said experience perhaps being best exemplified by the various illustrations of FIGS. 14-16 and aspects of the graphical user interface 216. In some embodiments, the operator is only prompted (or even able) to provide input for agricultural tasks where it is highly desirable and/or necessary.

For example, as the operator travels via tractor 100 through a field 274, the user is able to view agricultural data 208 in real-time before the agricultural data 208 or aspects thereof are converted, stored, and/or displayed as historical data. As shown in FIG. 14, a mapped view 216A shows areas (represented with solid black fill) which have recently been worked (e.g., tilled, planted, fertilized, etc.) by the agricultural implement 110. If an aspect of the agricultural and/or computerized system becomes unavailable and prevents live data from being displayed on a map, the computerized system will provide a means for tracking as much data as is available before the aspect becomes available again. For example, and with respect to FIG. 15, there can exist a separate, adjacent display which shows a hallway view 216B of live data while the aspect of the system (e.g., an Internet connection, GPS signal, etc.) remains unavailable. Once the unavailable aspect becomes available again, and depending upon the embodiment on which the invention is implemented, the intelligent control 152 of the computerized system will then determine how best to create a harmonized view 216C wherein agricultural data 208 associated with the live feed-mapped view 216A can be combined with data collected during periods of unavailability and associated with hallway view 216B.

So that the user can gauge whether aspects of the system are unavailable, there can exist a visual status indicator 216D on the display which may communicate one or more aspects of the system are available. In FIGS. 14 and 16, the visual status indicator 216D indicates the differential GPS system is available and thus the graphical user interface 216 displays only live data and a single mapped view 216A. In FIG. 15, the visual status indicator is replaced with an alert 216E, indicating the differential GPS system is not currently available.

The graphical user interface 216 can also provide the user the ability to select actions 216F, via input devices 212 (such as touch screen controls), which allows (e.g., via modules 202, 204, 206) for navigation of the computerized system and/or for the agricultural system to take perform certain agricultural tasks. Similarly, safety controls 216G allow the operator is able to engage safety elements on the agricultural implement 110.

Operation

Particularly beneficial methods for viewing historical and real-time geospatial and non-geospatial data can be carried out using those technical components and/or computerized systems described above.

During operation, agricultural sensors (e.g., seed sensor(s) 168, liquid fertilizer sensor(s) 171, alternator sensor(s) 177, temperature sensor(s) 178, vacuum sensor(s) 186, and the like) of the agricultural implement 110 can sense agricultural characteristics in real-time.

Agricultural data 208 is automatically generated by the intelligent control 152 of the agricultural implement 110 and includes numbers and/or text identifying said agricultural characteristics. The agricultural data 208 can be geospatial and/or non-geospatial, depending on whether a geographic location of the agricultural implement can be determined, such as through the use of a global positioning system (GPS) receiver.

As the agricultural data 208 is created, it can be stored in various locations, including the memory 190 of the intelligent control 152 and/or other storage devices 222, and given a designation, such as live data, historical data, temporary data, incomplete data, etc. Stored and/or live agricultural data 208 can be communicated between remote agricultural implements 110 in real time or on an as needed basis, at all times retaining the appropriate designation. The communications module 198 is typically the primary means through which the intelligent control 152 is able to establish a network connection (e.g., a connection to the Internet) and indicate when network connections have been lost. The communications module 198 and agricultural data 202 can work together such that, while maintaining a network connection, agricultural data 208 is stored a storage device remote of the agricultural implement 110 (e.g., a cloud based storage system, a database server 220, intelligent controls of tractors 100 and/or other agricultural implements 110, etc.) and while not maintaining the network connection, a storage device local to the agricultural implement 110 is utilized. Agricultural data 208 collected during periods where a network connection is lost can later be uploaded to a remote storage device via the network at a time when the network connection can again be established.

Depending on default and/or user-selected settings, the agricultural data module 202 and analytics module 204 of the intelligent control 152 will work together to intuitively show aspects of the agricultural data 208 via graphical user interface 216. For example, during periods of complete availability, the graphical user interface 216 might show which areas in the field 274 the tractor 100 and agricultural implement 110 are being worked, have already been worked, were not able to be worked, still need to be worked, and/or will later be worked, regardless of whether those areas are/were intended to be worked specifically by the tractor 100 and agricultural implement 110 combination on which the intelligent control 152 and graphical user interface 216 are located. Agricultural data 208 values associated with population rates and/or expected yield for a particular geographic location and/or region can be displayed through a mapped via 216A, as exemplified in FIG. 14. During periods of partial unavailability, the agricultural data module 202 and analytics module 204 will automatically, intuitively, and at least temporarily separate incompatible agricultural data 208. It is particularly advantageous to display said agricultural data 208 within the same view such that the user may simultaneously see both a mapped view 216A and hallway view 216B of historical and real-time geospatial and non-geospatial data. The "hallway" of the hallway view 216B is wide-enough to show a full planter worth of visual data. This information is drawn and stored in a manner which allows the user to see real time data as it appears, and also to scroll back in time to the start of their planting without location data. When multiple location data losses occur, a gap is introduced into this historical data to indicate a break in continuity of the data.

Viewing these separate, adjacent views will allow the operator the opportunity to recognize that some aspect of the system has become unavailable or has outright failed. Visual indicators 216D and alerts 216E will help the operator identify particular problems. For example, in FIG. 15 this has occurred because a geographic location of the agricultural implement could not be determined. Other examples of alerts 216E will include indication of sensors and/or components of the agricultural implement 110 not working, loss of a network connection, a portion of a field is believed to have been planted more or less than once, and the like. In the most extreme example where almost every aspect of the agricultural implement 110 is unavailable, the agricultural data 208 might simply be designated "error" or the display might simply show only historical and/or predictive data. the historical data and at least some aspects of the anticipated agricultural data.

During periods of unavailability, the mapped view 216A will remain constant, while remaining portions of the graphical user interface 216, including the hallway view 216B, will remain "live". These "live" aspects of the agricultural data 208 will be designated as having been collected during periods of unavailability and will be stored as temporary data. When the agricultural implement 110 returns to a more complete period of availability and after at least one aspect of the agricultural data 208 becomes available again, the module 202 and analytics module 204 will automatically and intuitively harmonize the agricultural data 208. Such harmonization may eliminate the need for, and even merit the dissolution of, the simultaneous and adjacent views shown in FIG. 15. Where the need for the simultaneous and adjacent views shown in FIG. 15 occurs, the temporary data associated with the hallway view 216B and the historical data associated with the mapped view 216A can be aggregated or "stitched" together such that the graphical user interface 216 can present said data to the operator within a single harmonized view 216C. The harmonized view 216C is substantially similar to the mapped view 216A except the harmonized view 216C will intuitively indicate (such as with the hatching shown in FIG. 16) that at least some of the agricultural data 208 has been collected during the period(s) of unavailability, thus maintaining a record of which portions relate to the temporary data and which portions relate to the historical data. Thus, if for whatever reason it is desirable to view and/or later separate these separate types of data, this can be easily accomplished.

It should be contemplated that there will exist at least a few embodiments wherein, perhaps because the certainty of events which occurred during periods of unavailability is high (e.g., calculated confidence levels are close to 100% and/or verification is manually provided by an operator)

compatible portions of the temporary data can be semi- or fully-converted into historical data.

The analytics module 204 in particular, and perhaps in order to create the harmonized view 216C, will perform various calculations, comparisons, and/or checks to consider which portions of the temporary data and/or historical data are compatible and can be simultaneously shown. Where gaps in the data exist, the analytics module 204 may even use other historical and/or predictive data and/or simultaneously predict data to fill said gaps such that a coherent display is generated. Other historical data can be based on real data gathered during a previous agricultural cycle.

The agricultural task module 206 will interact with the agricultural data module 202 and the analytics module 204 to instruct various non-software, such as mechanical and/or electrical components, of the agricultural implement 110 to take certain actions. The agricultural task module 206 can thus be much more reliant on user input, via input devices 212. However, it should still be appreciated that not all actions through which the agricultural task module 206 are partially responsible for requiring user input. For example, the agricultural task module 206 can automatically instruct the agricultural implement to plant seed and/or change course where the agricultural data 208 and analytics module 204 indicate it would be desirable to do so. The reverse order can also be true: namely, anticipated agricultural data 208 can be updated during operation of the agricultural implement 110 based on a change to a path of travel, a task to be performed, or a weather condition, regardless of whether the change was necessitated by user input. In yet another example, the analytics module 204 and agricultural task module 206 can work together to (i) calculate, using the agricultural data 208 and/or other sensed data, an output force capable of being automatically applied by an actuator of the agricultural implement and (ii) instruct said output force to be applied by means of actuation, respectively.

It should be appreciated aspects of the invention can still apply even where the agricultural sensors (e.g., seed sensor(s) 168, liquid fertilizer sensor(s) 171, alternator sensor(s) 177, temperature sensor(s) 178, vacuum sensor(s) 186, and the like) of the agricultural implement 110 are the only unavailable aspects of the agricultural system. When an ability to sense at least one agricultural characteristic is lost, the agricultural data 208 can be designated as being collected during a time period where a sensor has failed or faltered. Where safety is a concern and/or sensors and/or other components falter, are known to cause issues, and/or are simply not necessary for operation of a particular agricultural task, the operator can manually discontinue operation of (e.g., shutoff) a sensor and/or other component on the agricultural implement 110. For example, agricultural implements 110 can include a transport configuration and/or planting configuration, and one or more aspects of navigation systems, transmitters, sensors, and/or the intelligent control 152 thereon can be idled to conserve power and/or other resources during transport (or for virtually any other reason).

Navigation of the agricultural implement 110 can be accomplished through various functions unique to several different modules of the intelligent control 152 or can be primarily driven by a separate navigation system on the intelligent control 152 which works closely with the communications module 152.

From the foregoing, it can be seen that the invention accomplishes at least all of the stated objectives.

The present disclosure is not to be limited to the particular embodiments described herein. The following claims set forth a number of the embodiments of the present disclosure with greater particularity.

What is claimed is:

1. A computerized method for use with an agricultural implement comprising:
    sensing, in real-time, agricultural characteristics;
    communicating agricultural data associated with the agricultural characteristics, wherein the agricultural data is geospatial;
    storing communicated agricultural data as historical data;
    displaying the historical data in a mapped overview; and
    in times where at least one aspect of the agricultural data is unavailable, displaying at least one aspect of anticipated agricultural data in a mapped, subview adjacent to and isolated from the historical data in the mapped overview.

2. The computerized method of claim 1 further comprising determining a geographic location of the agricultural implement with a global positioning system (GPS) receiver.

3. The computerized method of claim 1 further comprising:
    in times where at least one aspect of the agricultural data is unavailable, storing said at least one aspect as temporary data; and
    after the at least one aspect of the agricultural data becomes available again:
        stitching the temporary data and the historical data together to form stitched data;
        within the stitched data, maintaining a record of which portions relate to the temporary data and which portions relate to the historical data; and
        after stitching the stitched data, separating the stitched data into the temporary data and the historical data.

4. The computerized method of claim 3 further comprising comparing the temporary data with the historical data.

5. The computerized method of claim 4 further comprising converting compatible portions of the temporary data into the historical data.

6. The computerized method of claim 4 further comprising, ceasing display of incompatible portions of the temporary data.

7. The computerized method of claim 1 further comprising alerting an operator when the at least one aspect of the agricultural data is unavailable.

8. The computerized method of claim 1 further comprising: initially predicting the anticipated agricultural data, wherein the anticipated agricultural data is based on real data gathered during a previous agricultural cycle.

9. The computerized method of claim 1 further comprising, in times where no aspects of the agricultural data are unavailable, integrally displaying the historical data and at least some aspects of the anticipated agricultural data.

10. The computerized method of claim 1 further comprising:
    replacing the at least some aspects of the anticipated agricultural data with a corresponding portion of the historical data in real time.

11. The computerized method of claim 1 further comprising:
while maintaining a network connection:
storing the historical data on a storage device remote of the agricultural implement;
while not maintaining the network connection:
storing the temporary data on a storage device local to the agricultural implement; and
after re-establishing the network connection:
uploading stitched data to the storage device remote of the agricultural implement.

12. The computerized method of claim 1 wherein the agricultural data comprises planting information selected from the group consisting of:
(a) an instruction to plant or not to plant;
(b) seed and/or fertilizer type;
(c) seed spacing; and
(d) depth of planting.

13. The computerized method of claim 1 wherein the agricultural data comprises efficiency information selected from the group consisting of:
(a) singulation (including skips and/or doubles);
(b) fertilizer rates;
(c) insecticide rates;
(d) ground contact rates;
(e) downforce rates; and/or
(f) population rates.

14. The computerized method of claim 1 wherein the agricultural data comprises vehicle information selected from the group consisting of:
(a) heading;
(b) velocity;
(c) fuel level; and
(d) technical capabilities
of a vehicle.

15. The computerized method of claim 1 wherein the agricultural data comprises forecast information selected from the group consisting of:
(a) time of day;
(b) air temperature;
(c) season;
(d) a weather condition; and
(e) geospatial coordinates.

16. The computerized method of claim 1 wherein the agricultural data comprises soil information selected from the group consisting of:
(a) moisture content;
(b) compaction;
(c) ground temperature;
(d) elevation;
(e) depth;
(f) slope of terrain; and
(g) soil composition.

17. A computerized system for use with an agricultural implement comprising:
a navigation system;
a transmitter capable of employing at least one communication protocol and connecting to a network;
a sensor for sensing one or more agricultural characteristics; and
a non-transitory computer readable medium comprising a processor, a memory, an operating system, and a compiler, wherein the non-transitory computer readable medium is configured to:
communicate agricultural data relating to one or more agricultural characteristics;
record the agricultural data as historical data;
in times where at least one aspect of the agricultural data cannot be recorded as historical data, output at least one aspect of anticipated agricultural data based upon a geographic location of the agricultural implement in a field;
instruct a display to display at least one aspect of the anticipated agricultural data in a mapped, detailed view adjacent to and isolated from the historical data displayed in a mapped, environmental view;
store said at least one aspect within the memory as temporary data; and
stitch the temporary data and the historical data together to form stitched data.

18. The computerized system of claim 17 further comprising a display configured to simultaneously show the anticipated data and the historical data on a shared screen.

19. A software application capable of being executed by a non-transitory computer readable medium associated with an agricultural implement, said non-transitory computer readable medium comprising a processor, a memory, an operating system, and a compiler, said software application comprising:
one or more programmatic modules configured to:
communicate agricultural data associated with one or more sensed agricultural characteristics;
store available agricultural data as historical data;
in times where at least one aspect of the agricultural data is unavailable, predict and/or communicate at least one aspect of anticipated agricultural data based upon a geographic location;
instruct a display to display at least one aspect of the anticipated agricultural data in a mapped, hallway view adjacent to and isolated from the historical data in the mapped, field view; and
stitch temporary data and the historical data together to form stitched data.

* * * * *